(12) United States Patent
Funakura

(10) Patent No.: US 7,773,782 B2
(45) Date of Patent: Aug. 10, 2010

(54) IMAGE OUTPUT APPARATUS, IMAGE OUTPUT METHOD AND IMAGE OUTPUT PROGRAM

(75) Inventor: Hiroyuki Funakura, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1190 days.

(21) Appl. No.: 11/369,864

(22) Filed: Mar. 8, 2006

(65) Prior Publication Data

US 2006/0204135 A1    Sep. 14, 2006

(30) Foreign Application Priority Data

Mar. 8, 2005  (JP) .............................. 2005-064194
Feb. 14, 2006  (JP) .............................. 2006-037271

(51) Int. Cl.
- G06K 9/00 (2006.01)
- G06K 9/34 (2006.01)
- G06K 9/36 (2006.01)
- G06K 9/32 (2006.01)
- G09G 5/00 (2006.01)

(52) U.S. Cl. ...................... 382/118; 382/173; 382/291; 382/296; 345/648

(58) Field of Classification Search ................. 382/118, 382/291
See application file for complete search history.

(56) References Cited

U.S. PATENT DOCUMENTS

| | | | |
|---|---|---|---|
| 5,905,807 A * | 5/1999 | Kado et al. ................. | 382/118 |
| 6,128,397 A * | 10/2000 | Baluja et al. ................. | 382/118 |
| 6,891,539 B1 * | 5/2005 | Maruyama et al. .......... | 345/629 |
| 7,515,154 B2 * | 4/2009 | Tanaka et al. ............... | 345/473 |
| 2003/0174869 A1 * | 9/2003 | Suarez ........................ | 382/118 |
| 2005/0146526 A1 | 7/2005 | Tanaka et al. | |

FOREIGN PATENT DOCUMENTS

| | | |
|---|---|---|
| EP | 0 755 022 A1 | 1/1997 |
| JP | 2004-221647 A | 8/2004 |
| JP | 2005-109693 A | 4/2005 |
| JP | 2005-196639 A | 7/2005 |
| WO | WO-03/005702 A1 | 1/2003 |

* cited by examiner

*Primary Examiner*—Matthew C Bella
*Assistant Examiner*—Jose M Torres
(74) *Attorney, Agent, or Firm*—Birch, Stewart, Kolasch & Birch, LLP

(57) ABSTRACT

An image output apparatus for automatically laying out a number of captured images in a composition without uncomfortable feeling and outputting the same is provided. The image output apparatus includes: an object orientation identification section for identifying the orientation of an object in an image; an image layout section for laying out the image within an output region based on the object orientation identified by the object orientation identification section; and an image output section for outputting the image laid out within the output region by the image layout section.

23 Claims, 19 Drawing Sheets

| PART | PART IDENTIFIER | PARTIAL IMAGE DATA |
|---|---|---|
| EYE | 600 |  |
| EAR | 610 |  |
| MOUTH | 620 |  |
| HAIR | 630 |  |
| ⋮ | ⋮ | ⋮ |

IMAGE OUTPUT APPARATUS, IMAGE OUTPUT METHOD AND IMAGE OUTPUT PROGRAM

CROSS REFERENCE TO RELATED APPLICATION

The present application claims priority from a Japanese Patent Applications Nos. JP 2005-064194 filed on Mar. 8, 2005 and JP 2006-037271, filed on Feb. 14, 2006, the contents of which are incorporated herein by reference.

BACKGROUND OF THE INVENTION

1. Field of the Invention

The present invention relates to an image output apparatus, an image output method, and an image output program. Particularly, the present invention relates to an image output apparatus, an image output method, and an image output program for automatically laying out a plurality of images within an output region.

2. Related Art

Conventionally, a number of images captured by a digital still camera on the trip have been laid out in a predetermined template, and then, displayed on a television monitor and printed on papers to view the images. Additionally, when a number of captured images are printed, the images are laid out in a magazine and an album by a designer, thus the images have been provided to viewers as disclosed in Japanese Patent Application Publication No. 2004-221647.

In the above disclosed invention, when a number of captured images are laid out in a predetermined template, the images are laid out regardless of the content of the images. Then, when such laid out images are displayed, the viewer sometimes feels uncomfortable about the composition in which the images are laid out because the visual appeal of the image layout is not considered. Additionally, in the case that the viewer lays out the images in an output region in consideration of the visual appeal of the image layout, the viewer should take a large amount of labor and times to select the images, to determine the composition in which the images are laid out, and to lay out the images when there are a number of images.

SUMMARY OF THE INVENTION

Thus, it is an object of the present invention to provide an image output apparatus, an image output method, and an image output program which are capable of solving the problem accompanying the conventional art. The above and other subjects can be achieved by combining the features recited in independent claims. Then, dependent claims define further effective specific example of the present invention.

To solve the above-described problem, a first aspect of the present invention provides an image output apparatus. The image output apparatus includes: an object orientation identification section for identify the orientation of the object in an image; an image layout section for laying out an image within an output region based on the orientation of the object identified by the object orientation identification section; and an image output section for outputting the image laid out within the output region by the image layout section. The image layout section may lay out the image within the output region such that the object identified by the object orientation identification section faces to the center of the output region.

Here, the object may be a person. The object orientation identification section may identify the orientation of the person in the image. The image layout section may lay out the image based on the orientation of the person identified by the object orientation identification section. Additionally, the object orientation identification section may identify the orientation of the person's face in the image. The image layout section may lay out the image based on the orientation of the person's face identified by the object orientation identification section. Further, the object orientation identification section has a face region extraction section for extracting the region of the person's face included in the image, a partial region extraction section for extracting a plurality of parts constituting a person's face included in the face region extracted by the face region extraction section and a face orientation identification section for identifying the orientation of the person's face in the image based on the positions of the plurality of parts extracted by the partial region extraction section in the person's face region extracted by the face region extraction section.

Additionally, the object orientation identification section may identify the line of sight of the person in the image. The image layout section may lay out the image based on the line of sight of the person identified by the object orientation identification section. Then, the image output section may include a display section for displaying the image laid out by the image layout section. The image layout section may lay out the image within the output region on the display screen of the display section based on the orientation of the object identified by the object orientation identification section. Further, the image output section may have a printing section for printing the image laid out by the image layout section. The image layout section may lay out the image within the output region of the printing media in the print section based on the orientation of the object identified by the object orientation identification section.

Further, the image output apparatus may include a template storage section for storing a template for the output region in which an image layout position and the orientation of the object included in the image to be disposed at the image layout position are previously determined, and an image selecting section for selecting an image in which the object orientation associated with the image layout position included in the template stored in the template storage section is corresponded to the object orientation identified by the object orientation identification section. The image layout section may lay out the image selected by the image selecting section at the image layout position in the template. Additionally, the image selecting section may select the image in which the area in the image located in the direction of the object orientation identified by the object orientation identification section is larger than the area in the image located in the direction opposite to the direction identified by the object orientation identification section.

Additionally, the image output apparatus may further include a trimming image generating section for trimming the object included in the image selected by the image selecting section such that the area in the image located in the direction of the object orientation identified by the object orientation identification section is larger than the area in the image located in the direction opposite to the object orientation direction identified by the object orientation identification section to generate a trimming image. The image layout section may lay out the trimming image generated by the trimming image generating section at the image layout position in the template. Further, the image output apparatus may include a transformed image generating section for generating an image geometrically transformed such that the object orientation identified by the object orientation identification section is corresponded to the object orientation associated with the image layout position in the template stored in the template storage section when there is no image in which the object orientation identified by the object orientation identification section is corresponded to the object orientation associated with the image layout position included in the template stored in the template storage section. The image layout section may lay out the image generated by the transformed image generating section at the image layout position.

Further, the image output apparatus may include a trimming section for trimming the image generated by the transformed image generating section into the shape of an image layout frame at the image layout position. The image layout section may lay out the image trimmed by the trimming section at the image layout position. Then, the object orientation identification section may identify information indicative of an angle between the direction to which the object faces and the normal line direction of the image plane. The template storage section stores a template in which the information indicative of the angle between the direction to which the object faces and the normal line direction of the image plane is associated with the image layout position. The image selecting section may select the image in which information indicative of the angle identified by the object orientation identification section is corresponded to information indicative of the angle associated with the image layout position included in the template stored in the template storage section.

The image output apparatus may further include an image rotational processing section for rotating the image along the horizontal direction of the image plane such that information indicative of the angle identified by the object orientation identification section is corresponded to information indicative of the angle associated with the image layout position of the template stored in the template storage section when there is no image in which the information indicative of the angle identified by the object orientation identification section is corresponded to the information indicative of the angle associated with the image layout position included in the template stored in the template storage section. The image layout section may lay out the image rotated by the image rotational processing section at the image layout position in the template. The image output apparatus further include a trimming section for trimming the image rotated by the image rotational processing section into the shape of an image layout frame at the image layout position. The image layout section may lay out the image trimmed by the trimming section at the image layout position.

The image selecting section may select the image in which the area in the image located in the direction of the object orientation identified by the object orientation identification section is larger when the angle indicated by the information identified by the object orientation identification section is larger. The image output apparatus may further include a trimming image generating section for generating a trimming image by trimming the object included in the image selected by the image selecting section such that the area in the image located in the direction of the object orientation identified by the object orientation identification section is larger when the angle indicated by the information identified by the object orientation identification section. The image layout section may lay out the trimming image generated by the trimming image generating section at the image layout position. The image layout section may lay out the trimming image generated by the trimming image generating section at the image layout position in the template. Additionally, the image output apparatus may further include a transformed image generating section for generating an image geometrically transformed such that information indicative of the angle identified by the object orientation identification section is corresponded to information indicative of the angle associated with the image layout position included in the template stored in the template storage section when there is no image in which the information indicative of the angle identified by the object orientation identification section is corresponded to the information indicative of the angle associated with the image layout position in the template stored in the template storage section. The image layout section may lay out the image generated by the transformed image generating section at the image layout position. Further, the image output apparatus may include a trimming section for trimming the image generated by the transformed image generating section into the shape of an image layout frame at the image layout position. The image layout section may lay out the image trimmed by the trimming section at the image layout position.

Still more, the image output section includes a template storage section for storing a template for the output region in which a first image layout position at which a first image should be disposed and a second image layout position at which a second image should be disposed are previously determined, a first image selecting section for selecting the first image to be disposed at the first image layout position, an object orientation determining section for determining the orientation of the object included in the second image to be disposed at the second image layout position depending on the orientation of the object included in the first image selected by the first image selecting section and a second image selecting section for selecting the second image including the object with the orientation determined by the object orientation determining section. The image layout section may lay out the first image selected by the first image selecting section at the first image layout position and also may lay out the second image selected by the second image selecting section at the second image layout position. Then, the template storage section may store the template for the output region in which the second image layout position and the relative object orientation with respect to the orientation of the object included in the first image are previously determined. The object orientation determining section may determine the orientation of the object included in the second image to be disposed at the second image layout position based on the orientation of the object included in the first image selected by the first image selecting section and the relative object orientation stored in the template storage section.

A second aspect of the present invention provides an image output method. The image output method includes the steps of: identifying the orientation of an object in an image; laying out the image within an output region based on the object orientation identified by the object orientation identifying step; and outputting the image laid out within the output region in the image laying out step.

A third aspect of the present invention provides an image output program for an image output apparatus for outputting images. The image output program operates the image output apparatus to function as: an object orientation identification section for identify the orientation of the object in an image; an image layout section for laying out an image within an output region based on the orientation of the object identified by the object orientation identification section; and an image output section for outputting the image laid out within the output region by the image layout section.

Here, all necessary features of the present invention are not listed in the summary of the invention. The sub-combinations of the features may become the invention.

According to the present invention, a number of captured images can be automatically laid out in the composition without felling uncomfortable and outputted the same.

DETAILED DESCRIPTION OF THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
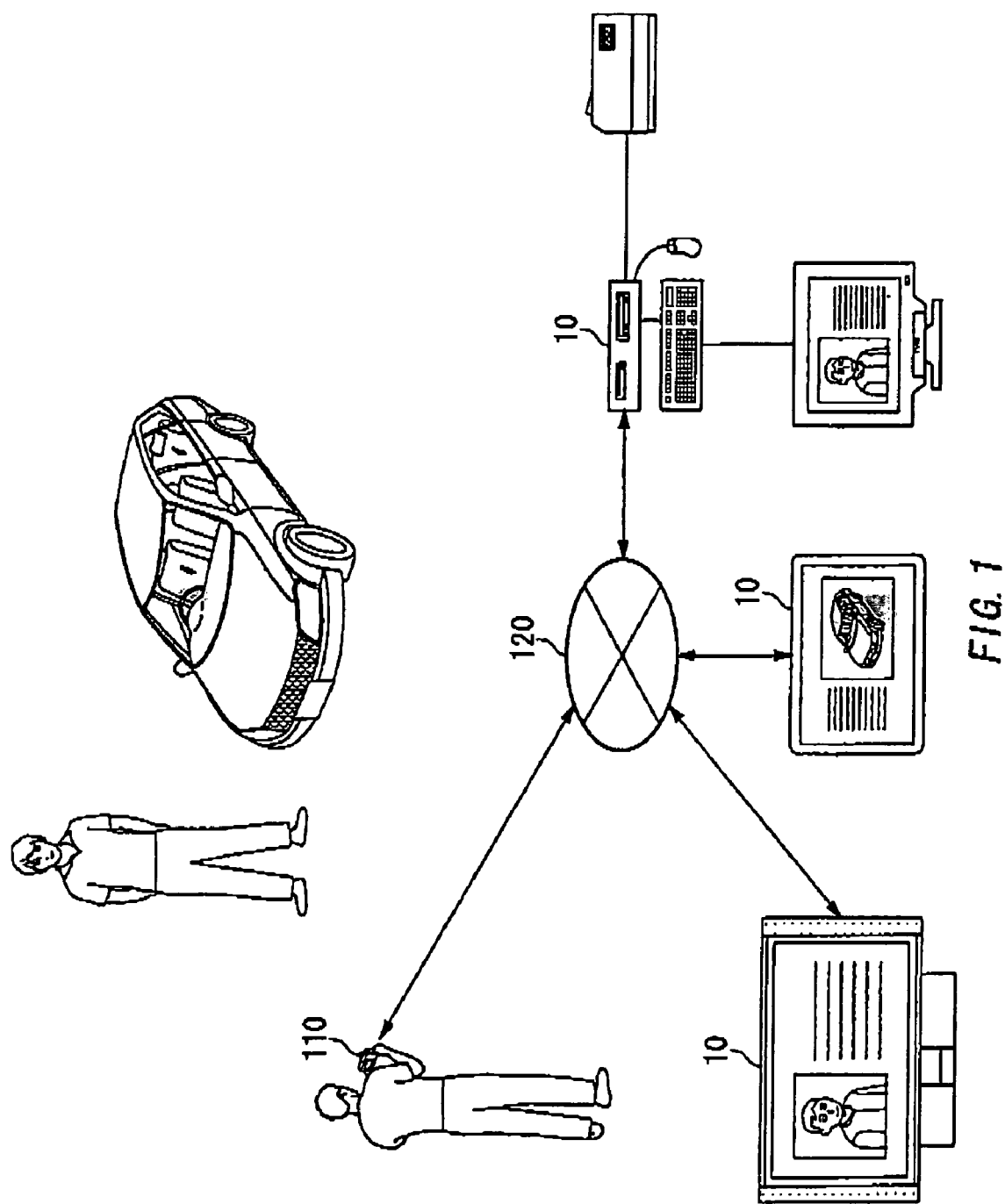
FIG. 1 is a conceptual diagram of an image output apparatus 10.

FIG. 1 is a conceptual diagram of an image output apparatus 10 according to a first embodiment of the present invention. The image output apparatus 10 lays out within an output region images captured by the image capturing apparatus 110 based on the orientation of an object such as a person and a car included in the captured image. Here, the output region is a display region on which the image is displayed or a printing region on which the image is printed. Then, the image output apparatus 10 outputs the image laid out within the output region. For example, the image output apparatus 10 may output the laid out image on a monitor of a personal computer. Additionally, the image output apparatus 10 may be a handheld terminal, such as a cellular phone and a PDA. Further, the image output apparatus 10 may be a printing device which can print the laid out image as a printed matter using a printer.

Further, the image output apparatus 10 may be a display device for receiving image data through a network 120 and displaying the received image data on a television receiver and a photostand. The network 120 may be such as Internet and a LAN. Here, the image output apparatus 10 may not only transmit/receive the captured image data through the network 120 but also input the image data to the image output apparatus 10 through such as a memory using a magnetic storage and a semiconductor storage medium. Further, the image data may be inputted to the image output apparatus 10 through radio communication and optical communication.

The image output apparatus 10 according to the present embodiment aims to automatically lay out the captured image in a composition without feeling uncomfortable by the viewer based on the orientation of the object included in the captured image.

Figure 2:
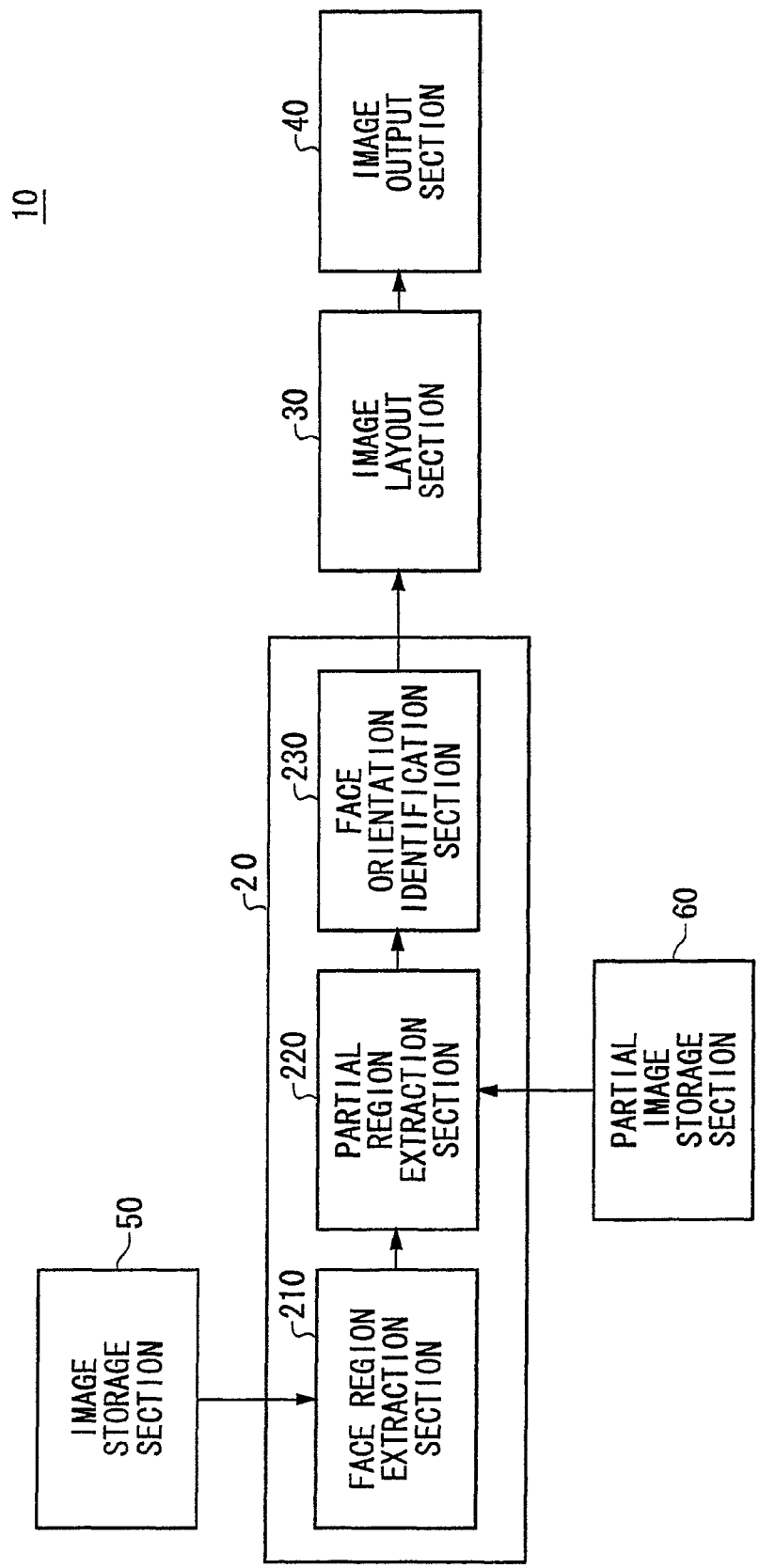
FIG. 2 is a block diagram showing the functional configuration of the image output apparatus 10.

FIG. 2 shows an example of the functional configuration of the image output apparatus 10 according to the present embodiment. The image output apparatus 10 includes an object orientation identification section 20, an image layout section 30, an image output section 40, an image storage section 50 and a partial image storage section 60. The object orientation identification section 20 has a face region extraction section 210, a partial region extraction section 220 and a face orientation identification section 230. The image storage section 50 stores captured image data. The image storage section 50 can store the captured data in association with the image identifier which allows to uniquely identify the captured image data. Then, the image storage section 50 outputs the image data to the object orientation identification section 20.

The object orientation identification section 20 identifies the orientation of the object in the image. The object orientation identification section 20 outputs image data on which the object orientation is identified to the image layout section 30. The image layout section 30 receives the image data on which the object orientation is identified from the object orientation identification section 20. Then, the image layout section 30 lays out the image within the output region based on the object orientation identified by the object orientation identification section 20. The image layout section 30 outputs the image data laid out within the output region to the image output section 40.

Here, the object orientation is the direction to which the front of the object faces to the image capturing apparatus in the real space. Most objects have the symmetrical front face. Accordingly, it can understand that the direction to which the symmetrical part is faced is the front the object. The object orientation identification section 20 may recognize the object included in the image by image processing such as edge extraction and color distribution analyzing and extract a symmetrical region in the object as the front of the object.

The extraction of the symmetrical region can be performed by reversing a part of the image of the object recognized by the object orientation identification section 20 and matching the image of the reversed part of object with the image of the un-reversed part of object. The matching may be performed after shading the image of the object recognized by the object orientation identification section 20. Then, when the reversed image of the object and the un-reversed image of the object are matched, the matched portion of the object is extracted as the symmetrical region, and the symmetrical region will be the front of the object.

The level of the shading may be adjusted in range that the symmetrical range can be extracted from the object. The range may be set by the viewer of the image output apparatus 10. Then, the object orientation identification section 20 can identify the object orientation based on the positional bias except for the front of object. For example, the object orientation identification section 20 may compare the portion inside the object which is determined as the front of object with the portion except for the front of object, and determines that the direction to which the front of the object is biased in the object is the direction to which the front of the object is faced. For example, when the portion except for the front is located in the right side in the image of the object, the object orientation in the image may be identified as the light side.

when the object included in the image is a person, the face region extraction section 210 extracts the region of the person's face included in the image. The face region extraction section 210 outputs the data of the region of the extracted person's face to the partial region extraction section 220. The partial image storage section 60 stores the average image data regarding a plurality of parts constituting the persons' face. The partial image storage section 60 outputs the partial image data to the partial region extraction section 220. The partial region extraction section 220 receives the data of the person's face region extracted from the face region extraction section 210 and also receives the partial image data from the partial image storage section 60.

Then, the partial region extraction section 220 extracts the plurality of parts constituting the person's face which are included in the extracted face region. The partial region extraction section 220 outputs the positional data of the plurality of parts constituting the extracted person's face in the face region to the face orientation identification section 230. The face orientation identification section 230 receives the positional data of the plurality of parts constituting the extracted person's face from the partial region extraction section 220. Then, the face orientation identification section 230 identifies the orientation of the person's face in the image based on the positions of the plurality of parts constituting the extracted person's face.

The image output section 40 receives the image data laid out within the output region from the image layout section 30. The image output section 40 may include a display section for displaying the image data laid out by the image layout section 30. Additionally, the image output section 40 may include a printing section for printing the image laid out by the image layout section 30.

The image output apparatus 10 according to the present embodiment can identify the orientation of the object in the image and automatically lay out the captured image in the output region based on the orientation of the identified object. Therefore, the viewer can output the image having the layout which does not cause the viewer to feel uncomfortable about the composition of the image without spending time and effort, that is, without determining the image layout by the viewer.

Figure 3:
FIG. 3 shows a partial image storage section 60.
Figure 3:
Figure 3:
Figure 3:

FIG. 3 shows an example of the partial image storage section 60 according to the present embodiment. The partial image storage section 60 stores standard partial image data of the parts constituting a person's face, such as eye, ear, mouth and hair. The partial image storage section 60 stores the partial image data in association with the part identifier which can uniquely identify the partial image data. Here, the part identifier may uniquely identify the partial image data. For example, the part identifier may be a character string which can identify the partial image data. Then, the partial image storage section 60 outputs the partial image data to the partial region extraction section 220.

Figure 4:
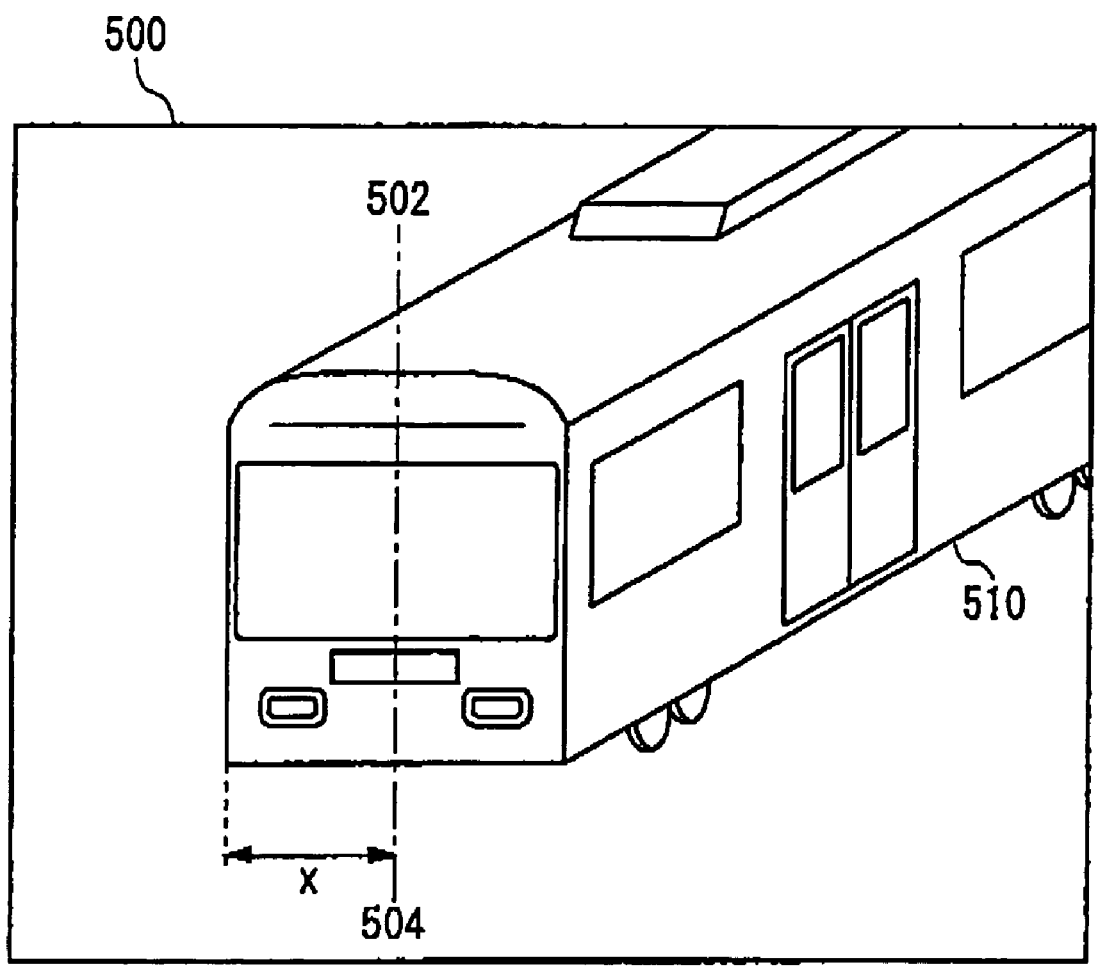
FIG. 4 shows a process of identifying the orientation of an object by an object orientation identification section 20.

FIG. 4 shows an example of the process of identifying the orientation of an object according to the present embodiment. In FIG. 4, the object orientation identification section 20 may perform matching processing by folding the image of a train 510 with the center line apart from both side ends of a train image 510 by a predetermined length x. Here, the object orientation identification section 20 may perform the matching processing after shading on the image of the train 510, and repeats the matching processing as gradually increasing the predetermined length x. For example, a part of the train image 510 may be folded with a dash line 502-504.

When a part of the folded image of the train 510 is matched with a part of the original image of the train 510, it may be determined that a region which is a part of the image of the train 510 from the dash line 502-504 to both side direction by the predetermined length x is the front of the train 510. Then, the orientation of the train 510 may be identified based on the bias of the parts except for the front of the train 510. For example, when the parts except for the front of the train 510 are got together in the right side of the train, the train 510 may be faced to the left. Here, the predetermined length x may be freely set in the range in which the front of the object included in the image is identified.

Figure 5:
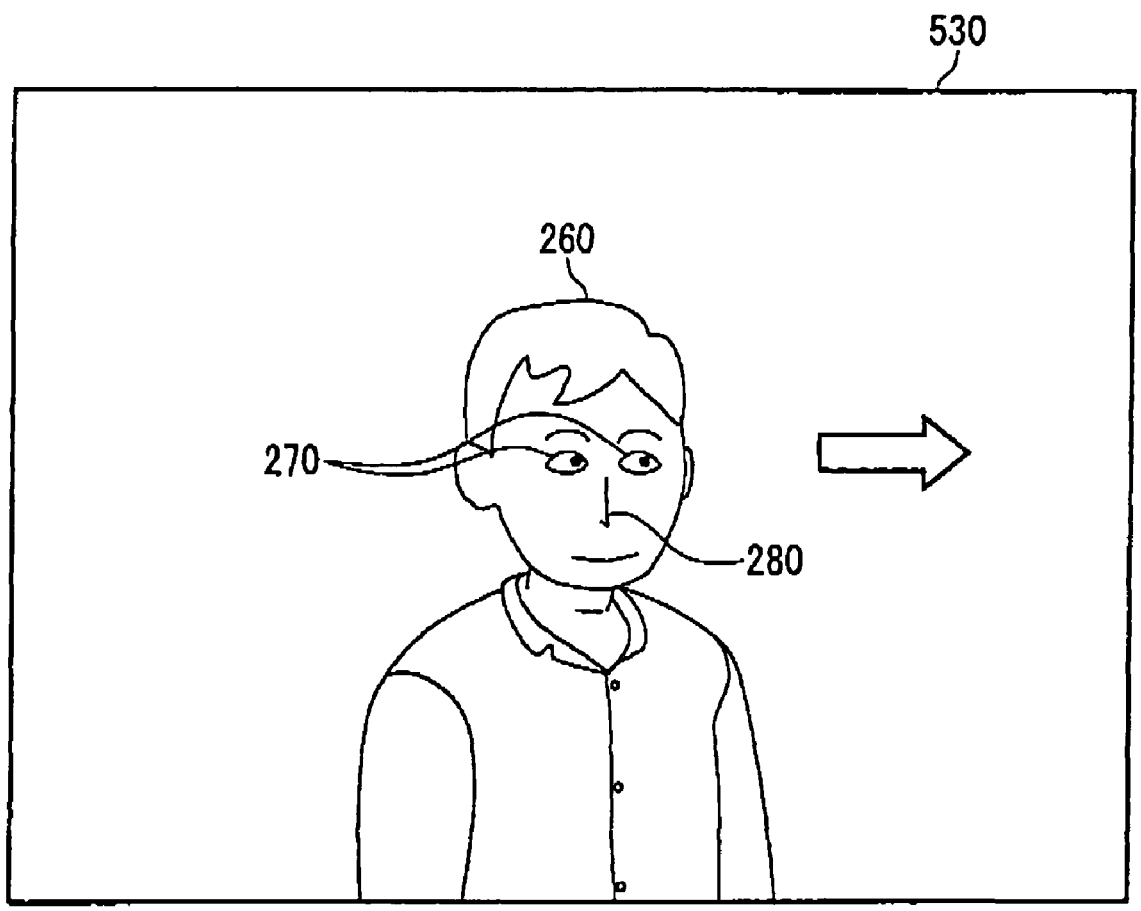
FIG. 5 shows a process of identifying the orientation of an object by an object orientation identification section 20.

FIG. 5 shows an example of the process of identifying the orientation of an object according to the present embodiment. The object may be a person in the present embodiment. The object orientation identification section 20 may identify the orientation of the person in the image. Additionally, the object orientation identification section 20 may identify the orientation of the persons' face in the image. The object orientation identification section 20 extracts the person in the image. The object orientation identification section 20 may extract the symmetrical region of the person in the image by shading processing and matching processing on the extracted image of the person. Then, the object orientation identification section 20 may identify the orientation of the person in the image based on the bias of the positions of parts except for the part of the front of the extracted person in the image.

The face region extraction section 210 extracts the region of the person's face from each of the extracted objects by superimposing a prepared template image of the face on the captured image by means of various positions, sizes and rotation angles to match therebtween and by image processing such as a flesh color extraction. The object orientation identification section 20 may extract the symmetrical region of the image of the person's face by matching processing after shading processing on the outline of the extracted person's face. Then, the object orientation identification section 20 may identify the orientation of the person's face in the image based on the bias of the positions of parts except for the part of the front of the extracted person in the image. For example, the symmetrical region in the image of the person's face is located in the right side, it is identified that the person's face is faced to the right side in the image.

The face region extraction section 210 outputs the data of the region of the extracted person's face to the partial region extraction section 220. The partial region extraction section 220 receives the partial image data from the partial image storage section 60 and also receives the data of the region of the extracted person's face outputted by the face region extraction section 210. The partial region extraction section 220 performs pattern matching between a plurality of parts constituting the person's face included in the region of the person's face extracted by the face region extraction section 210 and partial image data of the person's face inputted from the partial image storage section 60 and extracts the parts constituting the person's face. The partial region extraction section 220 outputs positional data of the plurality of extracted parts to the face orientation identification section 230.

The face orientation identification section 230 identifies the orientation of the person's face in the image based on the positions of the plurality of parts extracted by the partial region extraction section 220 in the region of the face extracted by the face region extraction section 210. For example, when eyes 270 extracted from the face of a person 260 are got together in the right side, it may be identified that the orientation of the person 260 in the image 530 is the direction to which the eyes 270 are got together, that is, the person 260 is faced to the right side.

When the partial region extraction section 220 extracts a nose 280 from the face of the person 260, the face orientation identification section 230 may detect the direction to which the tip of nose 280 is faced based on the shape of the nose 280 and determine that the direction to which the tip of the nose 280 is faced is the orientation of the person's face in the image. For example, since the tip of the nose 280 of the person 260 is faced to the right side in the image 530 in FIG. 5, it may be identified that the person 260 is faced to the right side in the image 530.

Additionally, the face orientation identification section 230 identifies the direction perpendicular to the orientation of the shoulder of the person as the orientation of the body of the person. Then, it may be determined that the identified orientation of the body of the person is the orientation of the person in the image. For example, the orientation of the person can be identified as follows: Firstly, the face region extraction section 210 extracts the person's face; Then, the object orientation identification section 20 recognizes the shoulder below the extracted person's face; Next, the object orientation identification section 20 identifies the orientation of the shoulder of the person based on the anteroposterior relationship of the upper arms of both arms.

For example, when the ratio between the right arm area and the image is larger than the ratio between the left arm and the image, the right arm is located at the front in the image. That is to say, the shoulder is faced to the left side in the image. In this case, the orientation of the person's body in the image is perpendicular to the orientation of the shoulder, that is the person's body is faced to the right side.

Here, when the orientation of the person's face identified by the face orientation identification section 230 is same as the orientation of the person's body identified by the object orientation identification section 20, the identified orientation of the face or the identified orientation of the body is determined as the orientation of the person in the image. Meanwhile, when the orientation of the person's face identified by the face orientation identification section 230 is different from the orientation of the person's body identified by the object orientation identification section 20 based on the orientation of the shoulder of the person, the orientation of the person in the image may be identified as follows.

For example, when the identified orientation of the face is faced to the front in the image, and the identified orientation of the body is faced to the direction different from the front in the image, the direction to which the body of the person faces is identified as the orientation of the person in the image. Meanwhile, when the identified orientation of the face in the image is different from the front, and the identified orientation of body is faced to the front in the image, the orientation of the face is identified as the orientation of the person in the image.

The image output apparatus 10 according to the present embodiment can identify the orientation of the person's face based on the positions of the plurality of parts in the face. Additionally, the image output apparatus 10 can identify the orientation of the person's body based on the orientation of the shoulder of the person. Then, the image output apparatus 10 can lay out the image based on the identified orientation of the person. Therefore, a number of images can be laid out in the composition which does not cause the viewer to feel uncomfortable without any special operation such as image layout by the viewer. Further, the image output apparatus 10 can lay out the image based on the orientation of the person's body. Therefore, the image can be appropriately laid out even if the image of the person is captured in the back.

Figure 6:
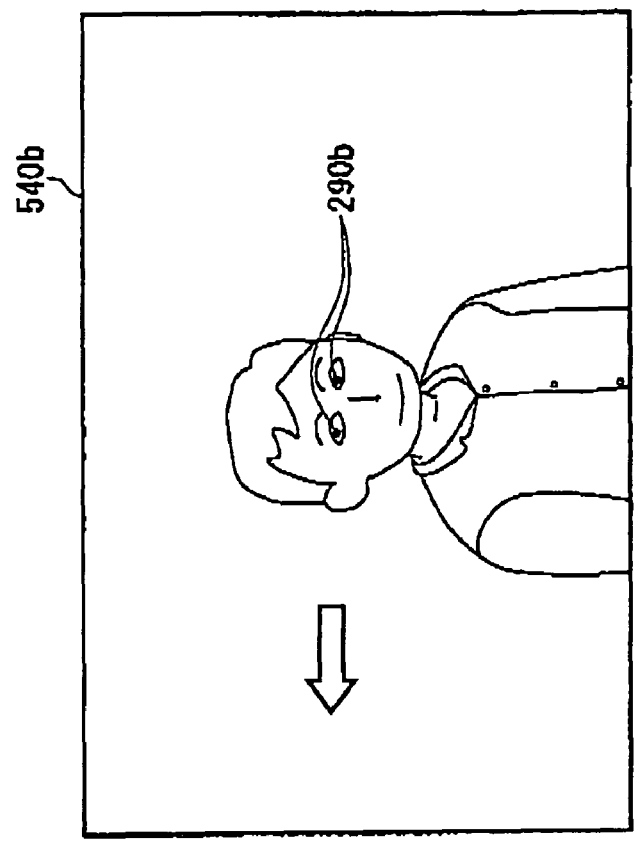
FIG. 6 shows a process of identifying the line of sight of a person by a face orientation identification section 230.
Figure 6:
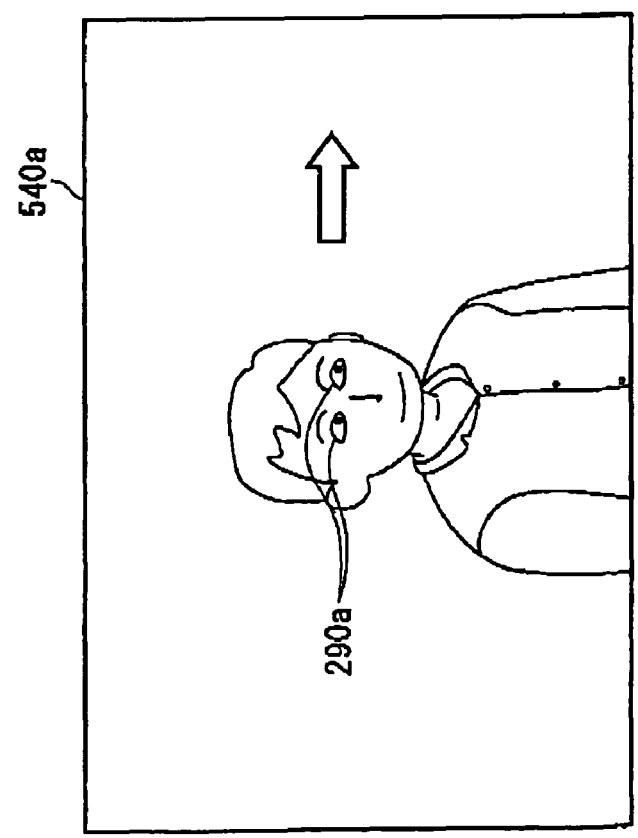

FIG. 6 shows an example of the process of identifying the line of sight of a person. The object orientation identification section 20 may identify the line of sight of the person in the captured image and lay out the image based on the identified line of sight of the person. In the image 540a, the irises of eyes 290a of the person are biased toward the right side. Accordingly, it may be determined that the line of sight is the direction to which the irises is biased, that is, the line of sight is the right direction being the arrow direction in the image 540a. Meanwhile, in the image 540b, the irises of eyes 290b of the person are biased toward the left side. Accordingly, it may be determined that the line of sight is the left direction in the image 540b. Here, the face orientation identification section 230 may determine that the orientation of the person's face identified by the object orientation identification section 20 is the line of sight of the person. The image layout section 30 can lay out the image based on the line of sight of the person identified by the object orientation identification section 20.

The image output apparatus 10 according to the present embodiment can identify the line of sight of the person in the image and lay out the image based on the line of sight of the person. Therefore, even if a part of the person's face is lacking in the image, the image can be laid out based on the line of sight of the person provided that the eyes of person are shown on the image.

Figure 7:
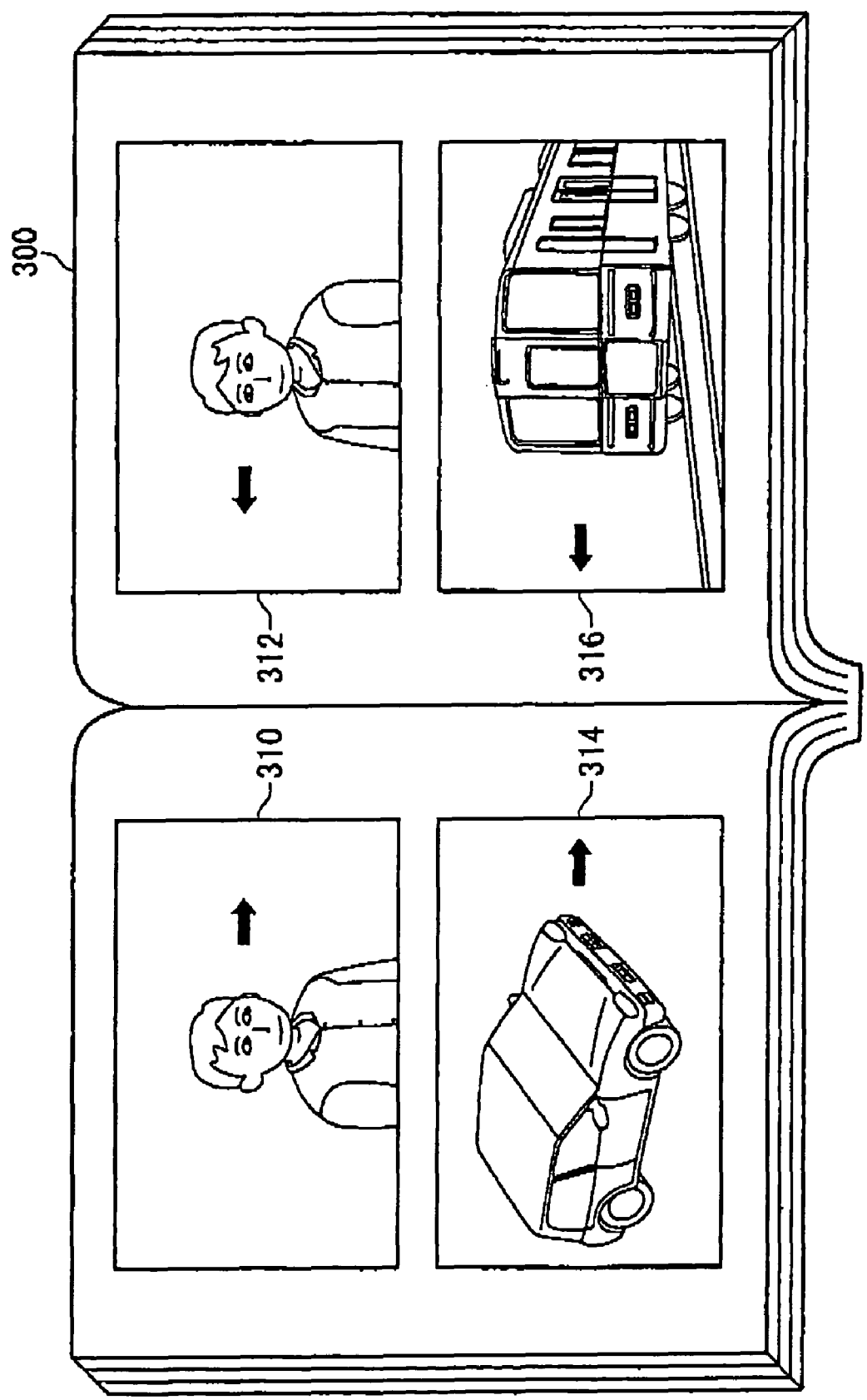
FIG. 7 shows an example of laying out an image by an image layout section 30.

FIG. 7 shows an example of the layout of images in an output region according to the present embodiment. The image layout section 30 lays out the image within the output region such that the orientation of the object identified by the object orientation identification section 20 is faced to the center of the output region. For example, the image layout section 30 may lay out images such that the orientation of objects such as persons shown on an image 310 and an image 312, a car shown on an image 314 and a train shown on a image 316 are faced to the center of facing pages of a book 300 such as a magazine. Here, the image layout section 30 may lay out in the facing two pages of the book 300 as one output region.

Figure 8:
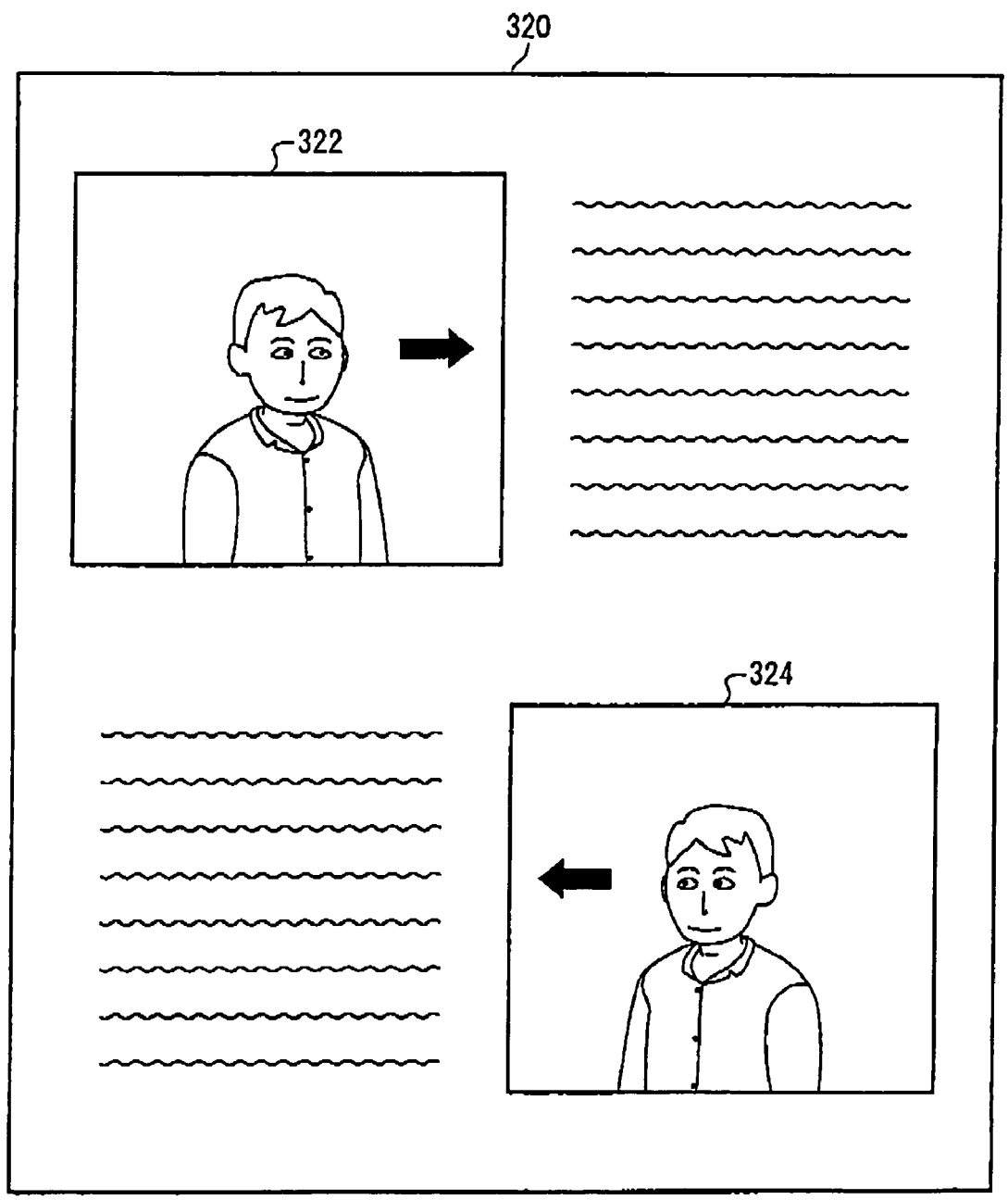
FIG. 8 shows an example of laying out an image by an image layout section 30.
Figure 9:
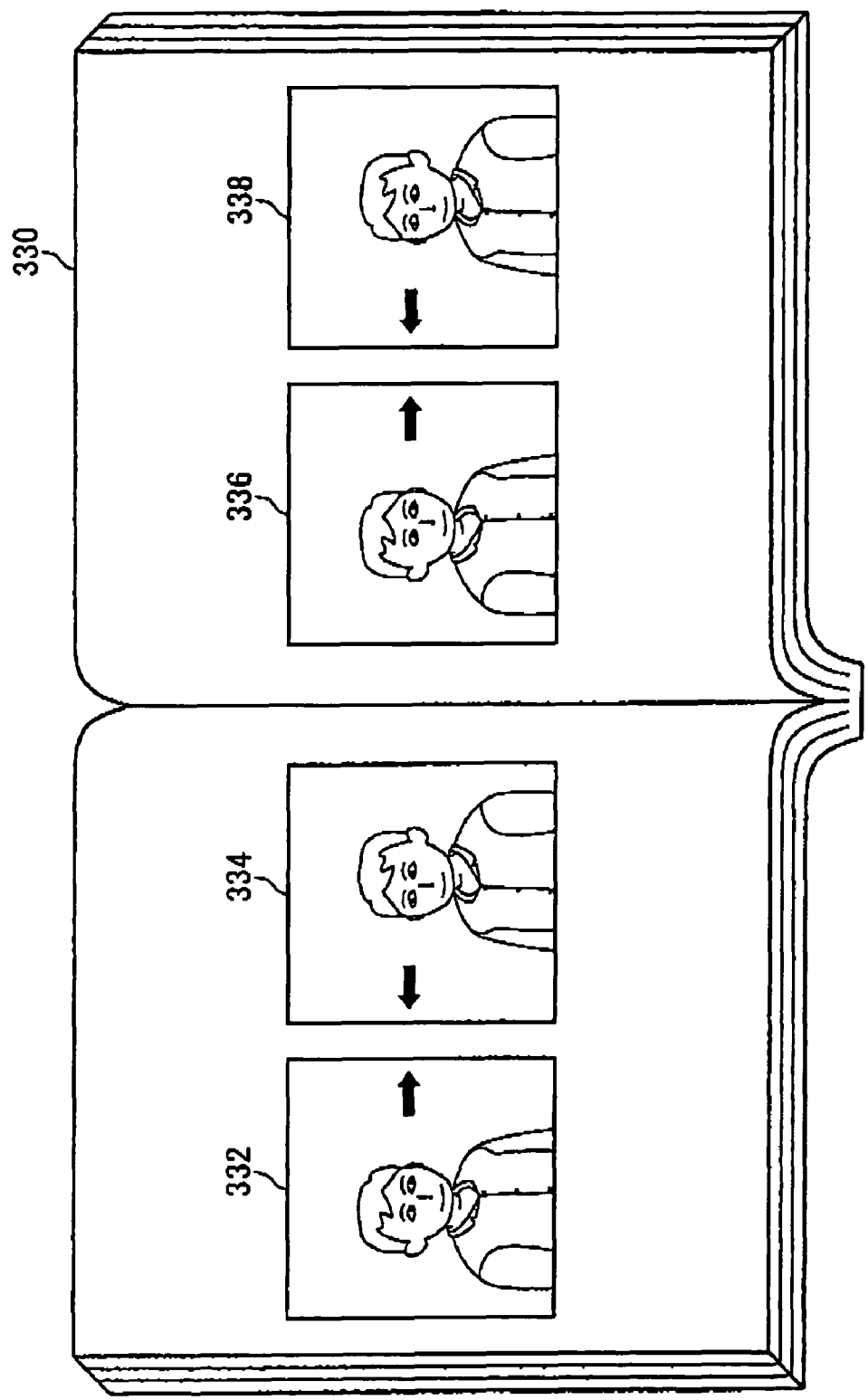
FIG. 9 shows an example of laying out an image by an image layout section 30.

FIG. 8 shows an example of the layout of images in an output region according to the present embodiment. In FIG. 8, the image layout section 30 can lay out images such that the orientation of objects such as persons included in an image 322 and an image 324 are faced to the center of a space 320 such as a poster FIG. 9 shows an example of the layout of images in an output region according to the present embodiment. For example, the image layout section 30 may lay out images such that the orientation of objects such as persons shown on an image 332, an image 334, and image 336 and an image 338 are faced to the center of each page of a book 330 such as a magazine.

Figure 10:
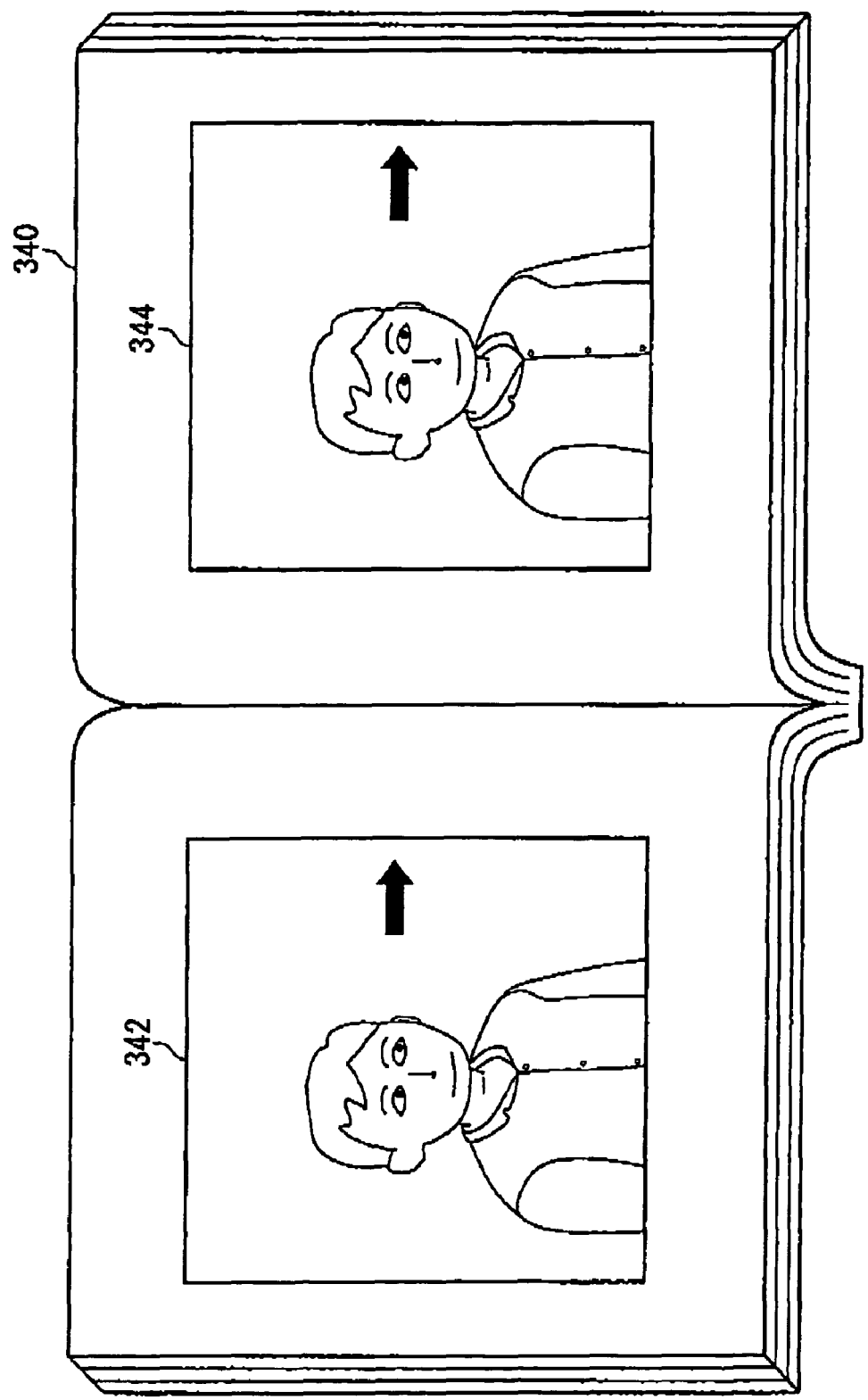
FIG. 10 shows an example of laying out an image by an image layout section 30.

FIG. 10 shows an example of the layout of images in an output region according to the present embodiment. In FIG. 10, the image layout section 30 can lay out images such that the orientation of objects such as persons shown on an image 342 and an image 344 are faced to the next page of a book 340 such as a magazine, for example.

The image output apparatus 10 according to the present embodiment can lay out images within the output region such that the orientation of the object identified by the object orientation identification section 20 is faced to the center of the output region. Therefore, the viewer can view the image with the good composition without feeling uncomfortable about the image layout.

Figure 11:
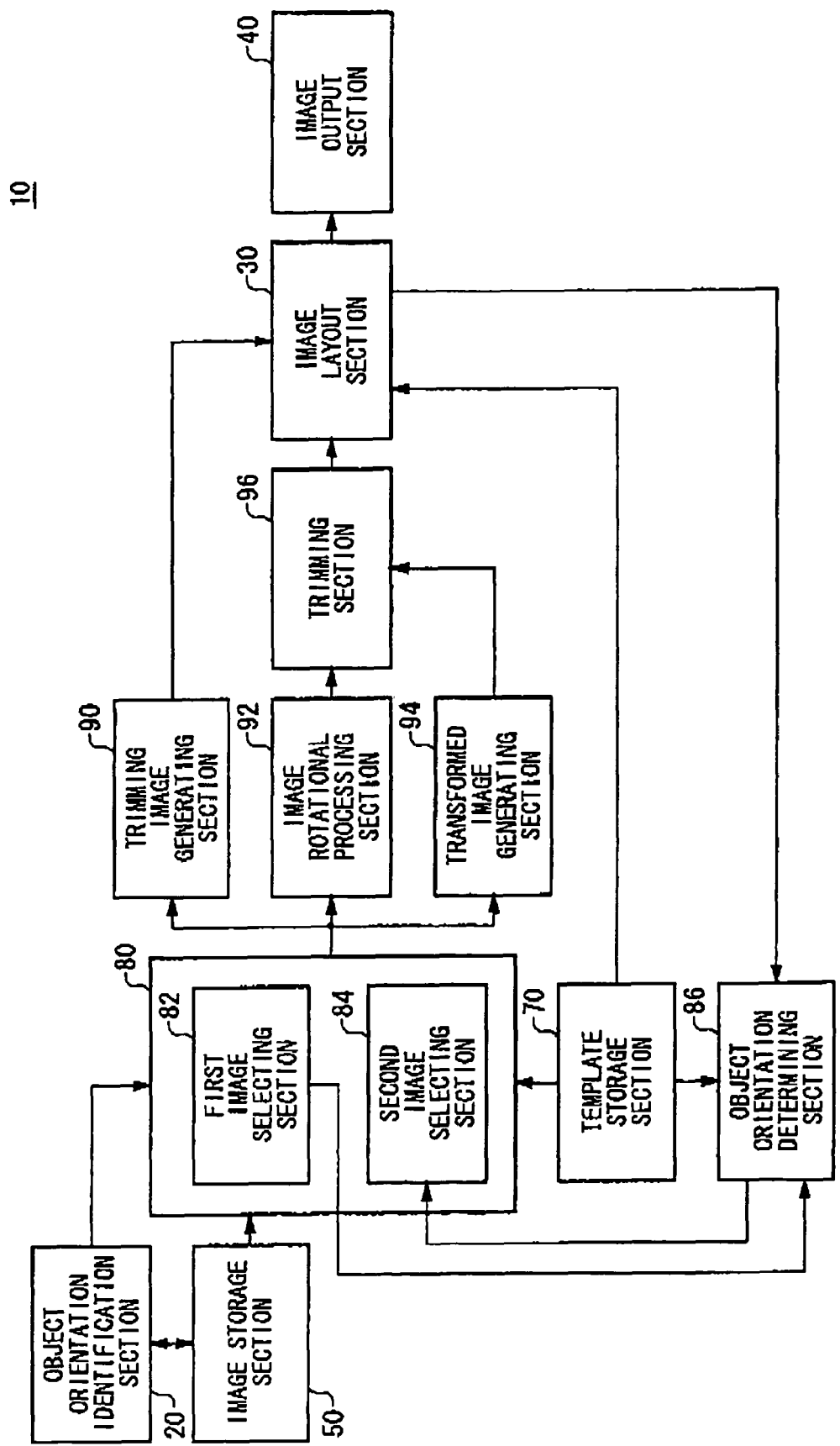
FIG. 11 is a block diagram showing the functional configuration of the image output apparatus 10.

FIG. 11 shows an example of the functional configuration of the image output apparatus 10 according to the present embodiment. The image output apparatus 10 includes a template storage section 70, an image selecting section 80, an object orientation determining section 86, a trimming image generating section 90, an image rotational processing section 92, a transformed image generating section 94 and a trimming section 96. Additionally, the image selecting section 80 has a first image selecting section 82 and a second image selecting section 84. Here, the image output apparatus 10 according to the present embodiment may further include a part of or all of the configurations and the functions of the image output apparatus 10 described above with reference to FIG. 1-FIG. 10.

The template storage section 70 stores a template for the output region in which an image layout position at which an image is disposed and the orientation of an object included in the image to be disposed at the image layout position are previously determined. In the template stored in the template storage section 70, at least one of the image layout position may be determined, and then, an image layout frame in which an image is laid out may be associated with the image layout position. Additionally, the template storage section 70 may store the template in which information indicative of an angle between the normal line direction of the image plane and the direction to which the object included in the image faces is associated with the image layout position. Additionally, the template storage section 70 may store a template for the output region in which a first image layout position at which a first image should be disposed and a second image layout position at which a second image should be disposed are previously determined. Then, the template storage section 70 may store the template for the output region in which the second image layout position and the relative orientation of the object with respect to the orientation of the object included in the first image are previously determined.

Here, composite information may be associated with the image layout position included in the template stored in the template storage section 70. The composite information may be information indicative of the characteristic of the image to be disposed at the image layout position. For example, the composite information may be information indicative of the name of the object included in the image, the position of the main object in the image, the direction component of the image and the angle between the normal line direction of the image plane and the direction to which the object included in the image faces. Here, the orientation of the object included in the image is an example of composite information. The template storage section 70 provides the composite information associated with the image layout position included in the template to the image selecting section 80 based on the control by the image selecting section 80. Additionally, the template storage section 70 provides the template to the image layout section 30 based on the control by the image layout section 30.

The image storage section 50 may store the image further in association with the composite information. The image storage section 50 provides the image to the image selecting section 80 based on the control by the image selecting section 80. The object orientation identification section 20 identifies the orientation of the object in the image and stores the identified object orientation in the image storage section 50 in association with the image. Additionally, the object orientation identification section 20 identifies information indicative of an angle between the normal line direction of the image plane and the direction to which the object faces. The object orientation identification section 20 may identify information indicative of an angle between the direction to which the front of the object faces and the normal line direction of the image plane. For example, when the object is a person, the object orientation identification section 20 may identify information indicative of an angle between the direction to which the person's face faces and the normal line direction of the image plane. Then, the object orientation identification section 20 may store the image in the image storage section 50 in association with the information indicative of the identified angle. The object orientation identification section 20 provides the information indicative of the identified angle to the image selecting section 80.

The image selecting section 80 selects the image associated with the composite information corresponding to the composite information associated with the image layout position included in the template stored in the template storage section 70 from the images stored in the image storage section 50. Specifically, the image selecting section 80 selects the composite information associated with the image layout position included in the template from the template storage section 70. More specifically, the image selecting section 80 receives the orientation of the object included in the composite information from the template storage section 70. Then, the image selecting section 80 selects the image in which the object orientation received from the template storage section 70 is corresponded to the object orientation identified by the object orientation identification section 20 from the image storage section 50. Additionally, the image selecting section 80 may select the image in which the area in the image located in the direction of the object orientation identified by the object orientation identification section 20 is larger than the area in the image located in the direction opposite to the direction identified by the object orientation identification section 20.

Further, the image selecting section 80 may select the image stored in the image storage section 50 in association with the information indicative of the angle corresponding to the information associated with the image layout position included in the template stored in the template storage section 70. Then, when the angle indicated by the information identified by the object orientation identification section 20 is larger, the image selecting section 80 may select the image in which the area in the image located in the direction of the object orientation identified by the object orientation identification section 20 is larger.

Additionally, the image selecting section 80 may include a first image selecting section 82 and a second image selecting section 84. The first image selecting section 82 selects a first image to be disposed at the first image layout position. For example, the first image may be a main image. The main image is an image intended to most impress on the viewer in the page of the album. For example, the main image may be an image on which the main character is shown in the album. Additionally, the main image may be an image which is most enhanced among a plurality of images laid out in the page. Specifically, the main image may be an image of which size is larger than the other images, may be an image disposed at more center than the other images and may be an image disposed at the nearest center. Additionally, the main image may be an image such as an image enhanced by the frame and an image given visual effect by such as effect processing. Additionally, the second image according to the present embodiment may be a sub-image. Here, the sub-image may be an image on which the subjects except for the main character are shown in the album. Additionally, the sub-image may be an image of which size is smaller than the main image and which is disposed at except for the center. Then, the second image selecting section 84 selects the second image including the object orientation determined by the object orientation determining section 86 described later. Specifically, the second image selecting section 84 selects the image including the object with the orientation determined by the object orientation determining section 86 from the image storage section 50. The image selecting section 80, the first image selecting section 82 and the second image selecting section 84 provide the selected image to the trimming image generating section 90, the image rotational processing section 92 or the transformed image generating section 94.

The object orientation determining section 86 determines the orientation of the object included in the second image to be disposed at the second image layout position depending on the orientation of the object included in the first image selected by the first image selecting section 82. Specifically, the object orientation identification section 20 determines the orientation of the object included in the second image to be disposed at the second image layout position based on the orientation of the object included in the first image selected by the first image selecting section 82 and the relative orientation of the object included in the composite information at the image layout position of the template stored in the template storage section 70. For example, the object orientation determining section 86 may determines that the orientation of the object included in the second image to be disposed at the second image layout position is equal to the orientation of the object included in the first image in order to dispose an image including the object of which orientation is equal to the orientation of the object included in the first image at the second image layout position. Additionally, the object orientation determining section 86 may determine that the orientation of the object included in the second image to be disposed at the second image layout position is different from the orientation of the object included in the first image. Further, when the template includes a plurality of image layout positions, the object orientation determining section 86 may individually determine the orientation for each of the image layout positions. The object orientation determining section 86 provides the determined orientation to the second image selecting section 84.

The trimming image generating section 90 trims the object included in the image received from the image selecting section 80 such that the area in the image located in the direction of the object orientation identified by the object orientation identification section 20 is larger than the area in the image located in the direction opposite to the object orientation identified by the object orientation identification section 20 and generates a trimming image. Additionally, when the angle indicated by the information identified by the object orientation identification section 20 is larger, the trimming image generating section 90 may trim the object included in the image received from the image selecting section 80 such that the area in the image located in the direction of the object orientation identified by the object orientation identification section 20 is larger than the area in the image located in the direction opposite to the object orientation identified by the object orientation identification section 20 and generate a trimming image. The trimming image generating section 90 provides the generated trimming image to the image layout section 30.

When the image selecting section 80 determines that information indicative of the angle identified by the object orientation identification section 20 is not corresponded to information indicative of the angle associated with the image layout position included in the template stored in the template storage section 70, the image rotational processing section 92 receives the information indicative of the angle and the image stored in the image storage section 50 from the image selecting section 80. Then, the image rotational processing section 92 rotates the received image along the horizontal direction of the image plane such that the information indicative of the angle received from the image selecting section 80 is corresponded to the information indicative of the angle associated with the image layout position of the template stored in the template storage section 70. The image rotational processing section 92 provides the rotated image to the trimming section 96.

When the image selecting section 80 determines that there is no image in which the direction of the object orientation identified by the object orientation identification section 20 is corresponded to the direction of the object orientation associated with the image layout position included in the template stored in the template storage section 70, the transformed image generating section 94 receives the object orientation and the image stored in the image storage section 50 from the image selecting section 80. Then, the transformed image generating section 94 generates an image geometrically transformed such that the object orientation received from the image selecting section 80 is corresponded to the object orientation associated with the image layout position of the template stored in the template storage section 70. For example, the transformed image generating section 94 may transform the received image into a parallelogram image so that the object orientation associated with the image layout position of the template is corresponded to the object orientation identified by the object orientation identification section 20.

Additionally, when the image selecting section 80 determines that there is no image in which the information indicative of the angle identified by the object orientation identification section 20 is corresponded to the information indicative of the angle associated with the image layout position included in the template stored in the template storage section 70, the transformed image generating section 94 receives information indicative of the angle and the image stored in the image storage section 50 from the image selecting section 80. Then, the transformed image generating section 94 may generate an image geometrically transformed such that the information indicative of the angle received from the image selecting section 80 is corresponded to the information indicative of the angle associated with the image layout position in the template stored in the template storage section 70. The transformed image generating section 94 provides the transformed image to the trimming section 96.

The trimming section 96 trims the images received from the transformed image generating section 94 and the image rotational processing section 92 into the shape of the image layout frame. The trimming section 96 provides the trimmed image to the image layout section 30. The image layout section 30 receives the template from the template storage section 70. Then, the image layout section 30 lays out the trimming image received from the trimming image generating section 90 and the trimmed image received from the trimming section 96 at the image layout position in the template. Additionally, the image layout section 30 may receive the image generated by the transformed image generating section 94 through the trimming section 96 and lay out the same at the image layout position in the template.

Additionally, the image layout section 30 lays out the first image selected by the first image selecting section 82 at the first image layout position. Next, the image layout section 30 provides the orientation of the object included in the first image to the object orientation determining section 86 when the image layout section 30 lays out the first image at the first image layout position. The direction component determination section 86 may determine the orientation of the object included in the second image to be disposed at the second image layout position depending on the orientation of the object included in the first image received form the image layout section 30. Then, the image layout section 30 lays out the second image selected by the second image selecting section 84 at the second image layout position. The image layout section 30 provides the laid out image to the image output section 40. The image output section 40 may cause the printing section to print the laid out image on medium such as papers and output the same as an album. Additionally, the image output section 40 may record the laid out image on a recording medium such as a DVD.

In the image output apparatus 10 according to the present embodiment, composite information is previously associated with the image layout position included in the template, so that the image corresponding to the composite information is automatically selected, and the selected image can be laid out at the image layout position. Therefore, the user can save the labor of selecting the image suitable for the image layout position among a number of images to lay out the same.

Figure 12:
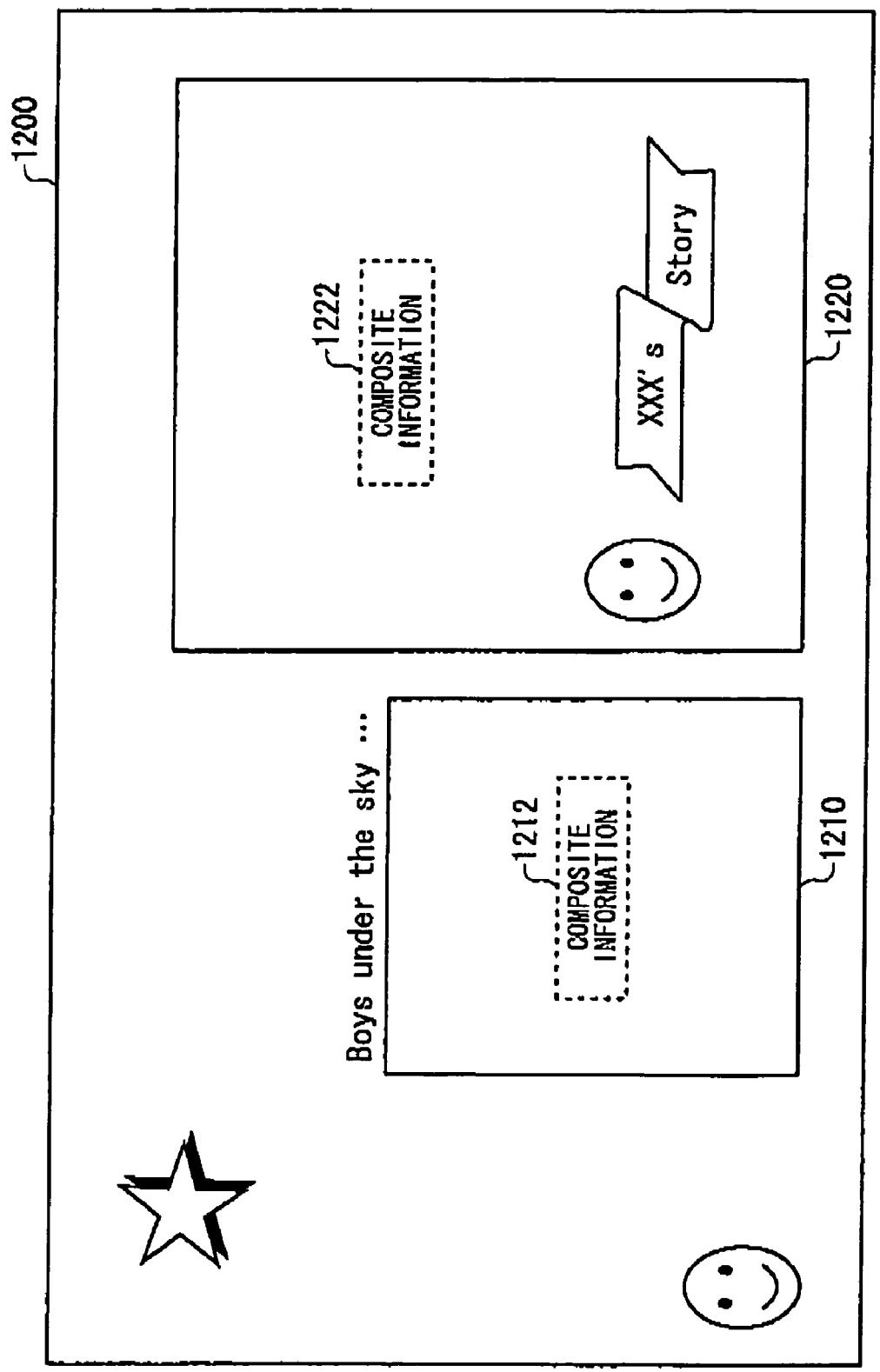
FIG. 12 shows a template 1200.

FIG. 12 shows an example of a template 1200 stored in the template storage section 70 according to the present embodiment. The template storage section 70 stores the template for the output region in which the image layout position and composite information on the image to be disposed at the image layout position. Here, an image layout frame in which the image is disposed may be associated with the image layout position. One output region may include a plurality of image layout positions. Additionally, the shape of the image layout frame may be such as an approximately circle, an approximately polygon and a shape of the object included in the image. Further, template storage section 70 may store a template for the output region in which a first image layout position at which a first image should be disposed and a second image layout position at which a second image should be disposed are previously determined. Additionally, the template storage section 70 may store a template for the output region in which the second image layout position and the relative object orientation with respect to the object orientation included in the first image.

Here, the composite information may be information indicative of the characteristic of the image to be disposed at the image layout position, such as the name of the object and the person's name included in the image, the cast of the person (depending on the kind of album, such as the main character in the album), information indicative of the position of the main character in the image, the birthday of the person included in the image, image-capturing information such as the focus distance at capturing the image, the date and time, and the location at which the image is captured, the direction component of the image and information indicative of the angle between the direction to which the object included in the image faces and the normal line direction of the image plane. Additionally, the template may be a template of the page of the album. Then, the pages of the album may be a cover, facing pages and one half of the facing pages.

For example, the template 1200 includes an image layout frame 1210 and an image layout frame 1220. The image layout frame 1210 is associated with composite information 1212. The image layout frame 1220 is associated with composite information 1222. In this case, the image selecting section 80 extracts the composite information 1222 associated with the image layout frame 1220 and selects the image stored in the image storage section 50 in associated with the information corresponding to the composite information 1222. For example, when the composite information 1222 is associated with the information on the object orientation, the image selecting section 80 selects the image stored in the image storage section 50 in association with the information corresponding to the information on the object orientation. Then, the image layout section 30 lays out the image selected by the image selecting section 80 in the image layout frame 1220.

Figure 13:
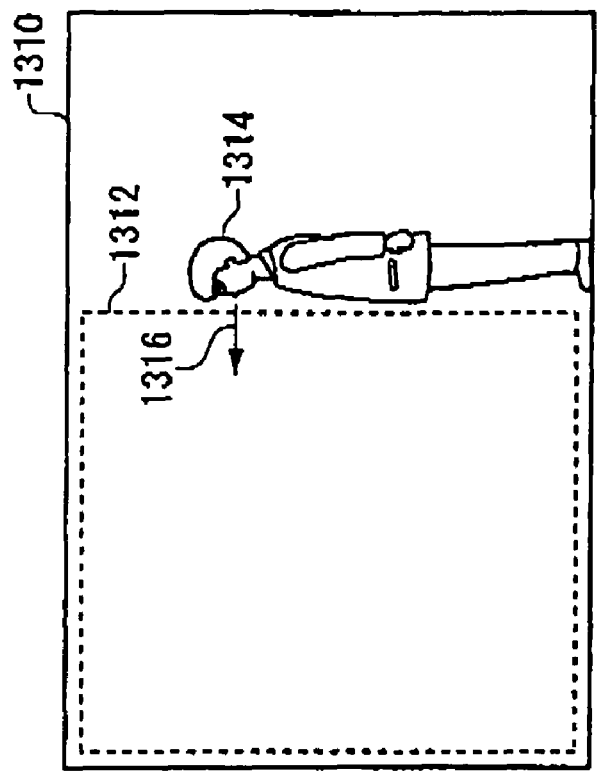
FIG. 13 shows the processing of an image selecting section 80 and a trimming image generating section 90.
Figure 13:
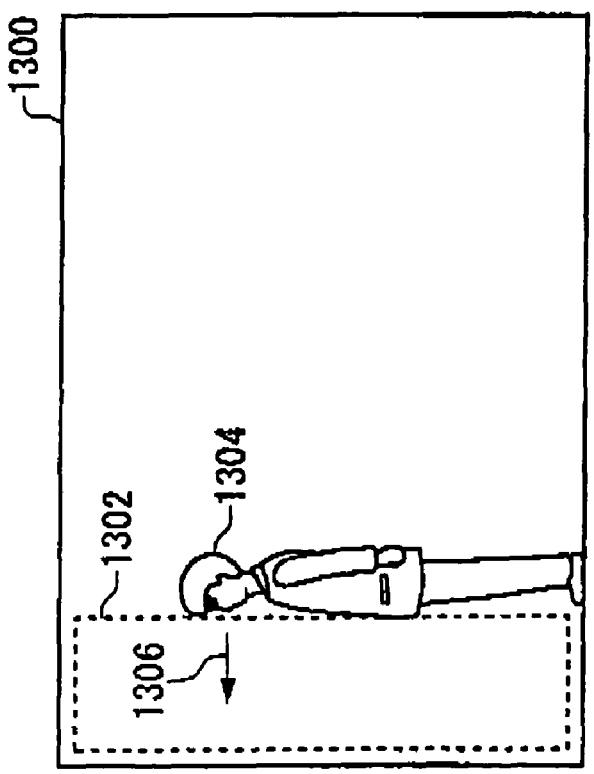

FIG. 13 shows the processing of the image selecting section 80 and the trimming image generating section 90 according to the present embodiment. The image selecting section 80 selects the image in which the area in the image located in the direction of the object orientation identified by the object orientation identification section 20 is larger than the area in the image located in the direction opposite to the direction identified by the object orientation identification section 20. For example, there are an image 1300 including a person 1304 and an image 1310 including a person 1314. In this case, the object orientation identification section 20 identifies that the person 1304 faces toward the direction indicated by an arrow 1306, and the person 1314 is faces toward the direction indicated by an arrow 1316.

In this case, the image selecting section 80 selects the image in which the area located in the direction to which the person faces is larger than the area located in the direction opposite to the direction to which the person faces. That is to say, in the image 1300, the region 1302 located in the direction to which the person 1304 faces is smaller than the region located in the direction opposite to the direction to which the person 1304 faces. Meanwhile, in the image 1310, the region 1312 located in the direction to which the person 1314 faces is larger than the region located in the direction opposite to the direction to which the person 1314 faces. Accordingly, in this case, the image selecting section 80 selects the image 1310 and provides the same to the image layout section 30.

Additionally, the trimming image generating section 90 may trim the object included in the image selected by the image selecting section 80 such that the area in the image located in the direction of the object orientation identified by the object orientation identification section 20 is larger than the area in the image located in the direction opposite to the direction of the object orientation identified by the object orientation identification section 20. For example, the image selecting section 80 selects the image 1300. In this case, the person 1304 included in the image 1300 faces to the direction indicated by an arrow 1306, and the area in the image 1300 located in the direction indicated by the arrow 1306 is smaller than the area in the image 1300 located in the direction opposite to the direction indicated by the arrow 1306. Accordingly, in this case, the trimming image generating section 90 may trim the person 1304 such that the area in the image 1300 located in the direction to which the person 1304 faces is larger than the area in the image 1300 located in the direction opposite to the direction to which the person 1304 faces. For example, the person 1304 may be trimmed as the layout in the image 1310.

In the image output apparatus 10 according to the present embodiment, the image selecting section 80 can automatically select the image in which the area in the image located in the direction of the object orientation is larger than the area in the image located in the direction opposite to the direction of the object orientation. Additionally, even if the image selecting section 80 can not select such image, the trimming image generating section 90 can automatically generate an image in which the area in the image located in the direction of the object orientation is larger than the area in the image located in the direction opposite to the direction of the object orientation. Thereby a large space can be provided in the direction to which the object faces, so that the viewer can view an album in which the image is laid out without feeling uncomfortable.

Figure 14:
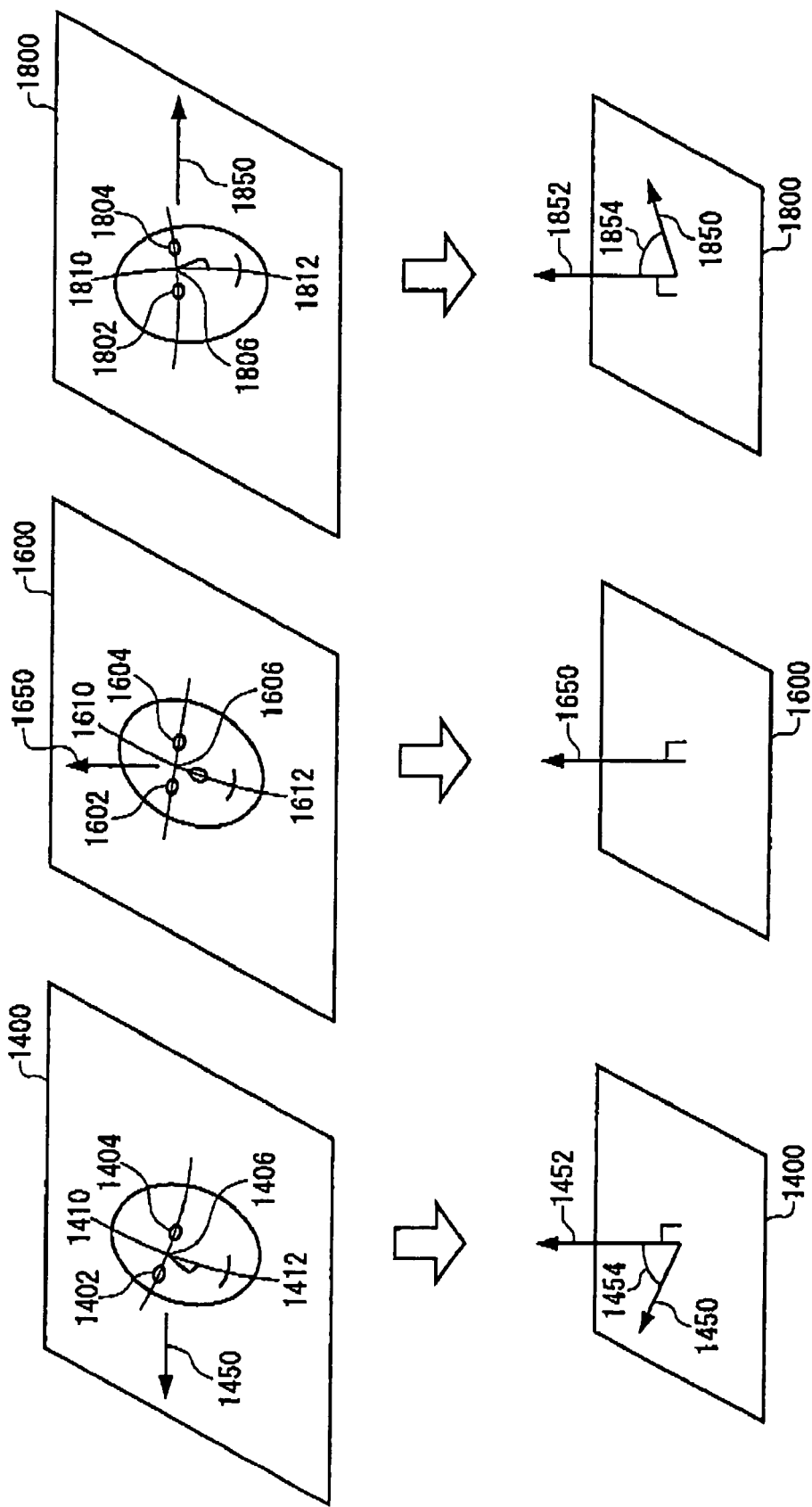
FIG. 14 shows the processing of an object orientation identification section 20.

FIG. 14 shows the processing of the object orientation identification section 20 according to the present embodiment. The object orientation identification section 20 identifies information indicative of an angle between the normal line direction of the image plane and the direction to which the object faces. For example, the object is a person. Here, the object orientation identification section 20 may identify the direction to which the person faces based on the distance between both eyes and the position of the nose in the face provided that the person faces the front. Additionally, in another example of the present embodiment, the object orientation identification section 20 may identify the direction to which the person included in the image faces based on the shape of triangle obtained by connecting the positions of both eyes and the position of the tip of nose by a line. Further, in another example of the present embodiment, the object orientation identification section 20 may identify the direction to which the person's face included in the image faces based on the area for cheeks in the face.

For example, the person faces the front in an image 1600. In the image 1600, the normal line direction 1650 in the image corresponds to the direction to which the person faces. Then, the object orientation identification section 20 calculates the intersection 1606 of the line passing through an eye 1602 and an eye 1604, and the line passing through the top of the head, the nose and a chin 1612. Next, the object orientation identification section 20 calculates the distance between the eye 1602 and the intersection 1606, and the distance between the eye 1604 and the intersection 1606, respectively. When the person faces the front, the distance between the eye 1602 and the intersection 1606 is approximately equal to the distance between the eye 1604 and the intersection 1606. Accordingly, the object orientation identification section 20 may identify information indicative of the angle between the direction to which the person faces and the normal line direction of the image plane based on the ratio between the distance between the eye 1602 and the intersection 1606 and the distance between the eye 1604 and the intersection 1606 provided that the person faces the front.

Additionally, the object orientation identification section 20 may have a database associated with the information indicative of the angle between the direction to which the person faces and the normal line direction of the image plane in association with the ratio between the distance between the one eye and the intersection and the distance between another eye and the intersection. The object orientation identification section 20 calculates the distance between one eye of the person included in the image and the intersection of the line passing through both eyes and the line passing through the top of the head to the chin of the person, and the distance between another eye and the intersection of the line passing through both eyes and the line passing through the top of the head to the chin of the person, and then, calculates the ratio between the distance between one eye and the intersection and the distance between another eye and the intersection. Then, the object orientation identification section 20 may identify information indicative of the angle stored in the database in association with the calculated ratio.

For example, in an image 1400, there is an angle between a normal line direction 1452 of the plane of an image 1400 and the direction 1450 to which the person faces. Firstly, the object orientation identification section 20 calculates the distance between an eye 1402 and an intersection 1406, and the distance between an eye 1404 and an intersection 1406. Next, the object orientation identification section 20 calculate the ratio between the distance between the eye 1402 and the intersection 1406 and the distance between the eye 1404 and the intersection 1406. Then, object orientation identification section 20 compares the ratio between the calculated distance between the eye 1402 and the intersection 1406 and the calculated distance between the eye 1404 and the intersection 1406 with the ratio stored in the database in association with the information indicative of the angle and identifies the corresponding ratio. Then, the object orientation identification section 20 identifies information on an angle 1454 between the direction 1450 to which the person faces and the normal line direction of the plane of the image 1400 stored in the data base in association with the identified ratio. In the same way, the object orientation identification section 20 identifies the information on an angle 1854 between the direction 1850 to which the person faces and the normal line direction 1852 of the plane of the image 1800.

Figure 15:
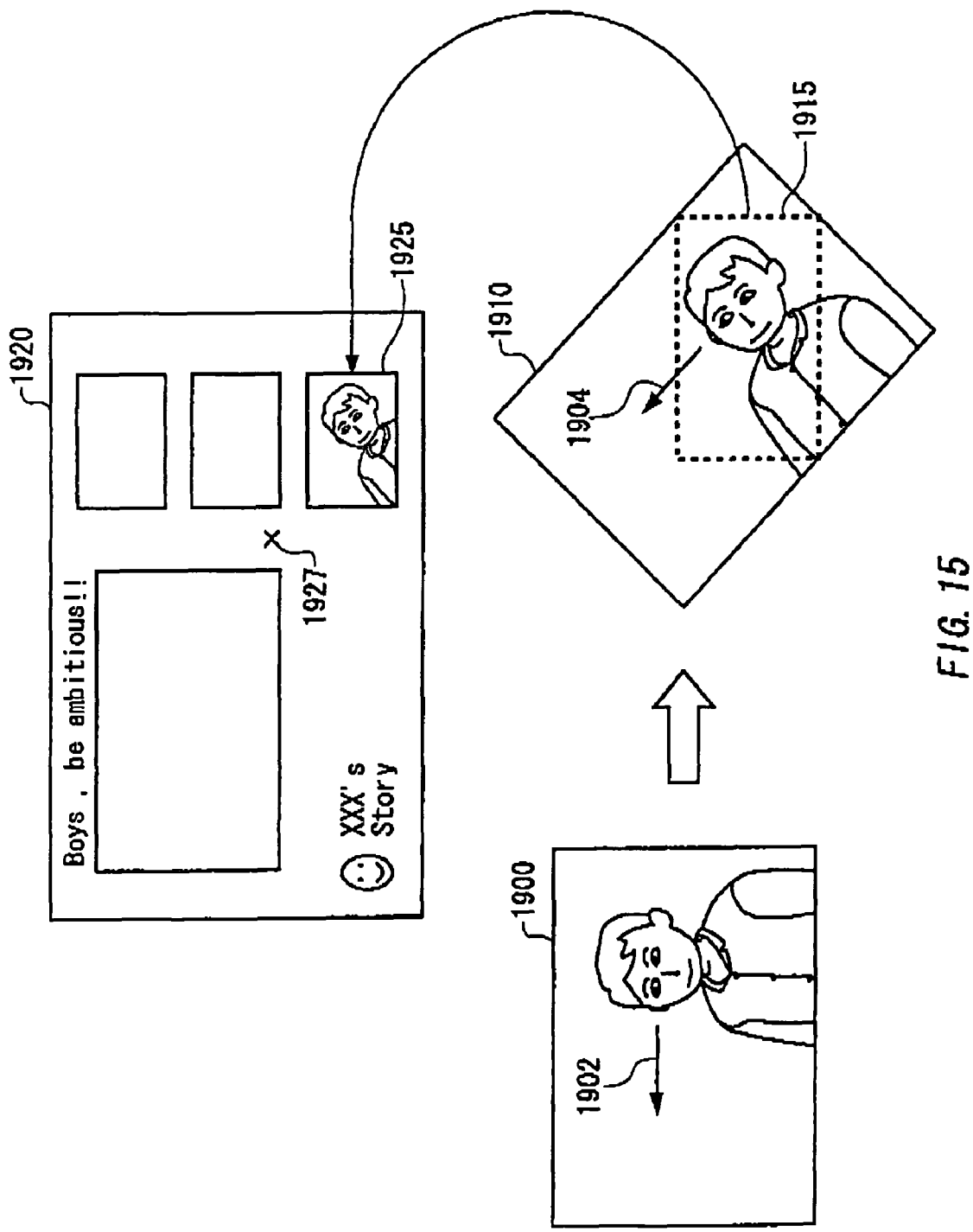
FIG. 15 shows the processing of an image rotational processing section 92 and a trimming section 96.

FIG. 15 shows the processing of the image rotational processing section 92 and the trimming section 96 according to the present embodiment. Here, the direction to which the person included in the image faces is associated with an image layout frame 1925 corresponding to the image layout position in a template 1920 as composite information on the image to be disposed in the image layout frame 1925. That is to say, the composite information on the direction is association with the image layout frame 1925 such that the image in which the person's face faces to the direction toward a position 1927 in the template 1920 is disposed.

Here, when the image storage section 50 stores only an image 1900 including the person who faces to a direction 1902, the image rotational processing section 92 rotates the image 1900 along the horizontal direction of the plane of the image 1900 such that information indicative of the direction associated with the image layout frame 1925 of the template 1920, that is a direction 1904 is corresponded to a direction 1902 to which the person included in the image 1900 faces. Next, the trimming section 96 trims an image 1915 shaped into the image layout frame 1925 from an image 1910 rotated by the image rotational processing section 92. Then, the trimming section 96 provides the trimmed image 1915 to the image layout section 30. Then, the image layout section 30 lays out the image 1915 in the image layout frame 1925.

The image output apparatus 10 according to the present embodiment can automatically rotate the image to correspond the same to the composite information even if there is no image corresponding the composite information associated with the image layout position included in the template. Therefore, the user need not capture again an image corresponding to the composite information and perform image processing by hand in order to make the image correspond to the composite information, so that the labors can be significantly reduced.

Figure 16:
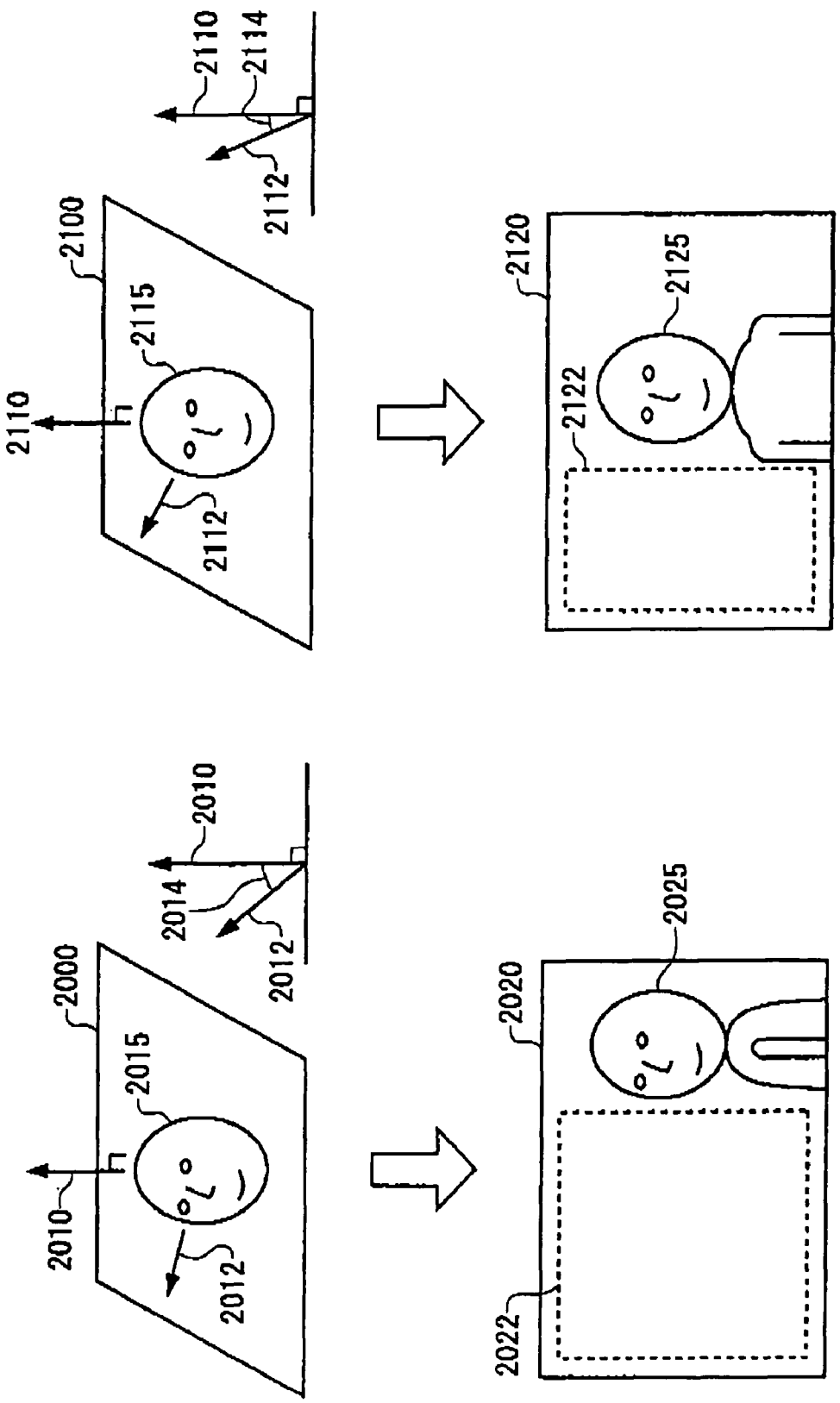
FIG. 16 shows the processing of an image selecting section 80 and a trimming image generating section 90.

FIG. 16 shows the processing of the image selecting section 80 and the trimming image generating section 90 according to the present embodiment. The image selecting section 80 selects the image in which the area in the image located in the direction of the object orientation identified by the object orientation identification section is larger when the angle indicated by the information identified by the object orientation identification section 20 is larger.

For example, comparing an angle 2014 between a direction to which a face 2015 included in an image 2000 faces and an normal line direction 2010 with an angle 2114 between a direction to which a face 2115 included in an image 2100 faces and a normal line direction 2110, the angle 2014 in the image 2000 is larger than the angle 2114 in the image 2100. In this case, when the angle identified by the object orientation identification section 20 is the angle 2014, the image selecting section 80 selects the image 2020 in which the area in the image located in the direction of the face orientation is larger. Meanwhile, when the angle identified by the object orientation identification section 20 is the angle 2114, the image selecting section 80 may select an image 2120 in which the region 2122 in the image located in the direction of the face orientation is smaller than that in the image 2020 in comparison with the case of the angle 2014.

Additionally, when the angle indicated by the information identified by the object orientation identification section 20 is larger, the trimming image generating section 90 generates a trimming image by trimming the object included in the image selected by the image selecting section 80 such that the area in the image located in the direction of the object orientation is larger than the area in the image located in the direction opposite to the direction identified by the object orientation identification section 20. For example, in the case that the image selecting section selects the image 2000, a person's face 2015 included in the image 2000 faces to a direction 2012. Then, the trimming image generating section 90 may trim the person's face 2015 such that the area in the image 2000 located in the direction 2012 is larger than the area in the image 2000 located in the direction opposite to the direction 2012 to generate a trimming image.

The image output apparatus 10 according to the present embodiment can automatically select the image in which the area in the image located in the direction of the object orientation is larger than the area in the image located in the direction opposite to the object orientation when the angle between the direction to which the object faces and the normal line direction of the image plane is larger. Additionally, even if the image selecting section 80 can not select such image, the trimming image generating section 90 can automatically generate an image in which the area in the image located in the direction of the object orientation is larger than the area in the direction opposite to the object orientation. Thereby a large space can be obtained in the direction of the object orientation, so that the viewer can view the album in which the image is laid out without feeling uncomfortable about the composition.

Figure 17:
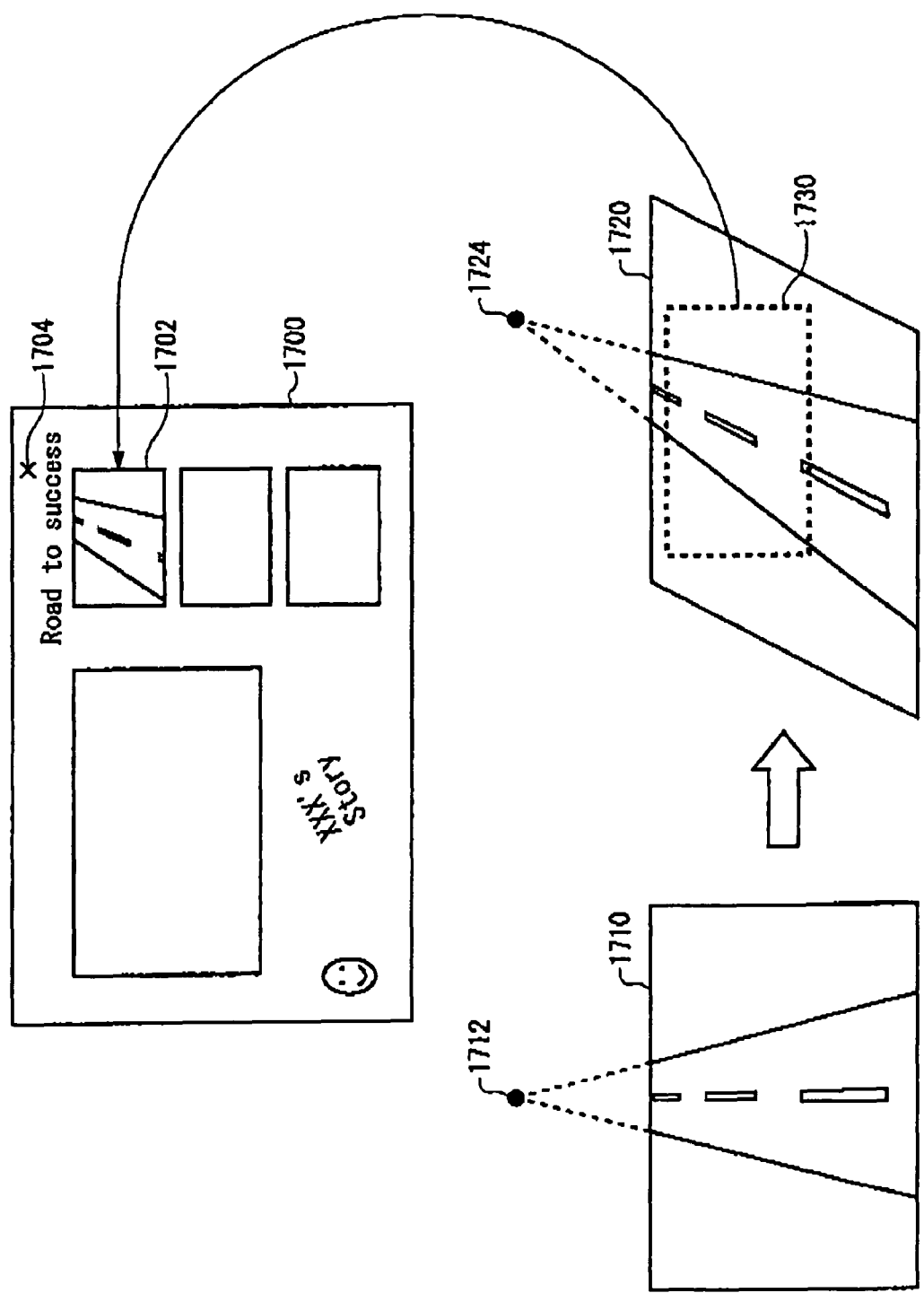
FIG. 17 shows the processing of a transformed image generating section 94 and a trimming section 96.

FIG. 17 shows the processing of a transformed image generating section 94 and a trimming section 96 according to the present embodiment. Here, the direction of an image is associated with an image layout frame 1702 corresponding to the image layout position included in a template 1700 as composite information on the image to be laid out in the image layout frame 1702. That is to say, the composite information on the direction of the image is associated with the image layout frame 1702 in order to dispose the image in the direction corresponding to the direction toward a position 1704 in the template 1700.

Here, for example in the case that the image storage section 50 stores only an image 1710 facing to a vanishing point 1712, the transformed image generating section 94 generates an image 1720 by geometrically transforming the image 1710 such that information indicative of the direction associated with the image layout frame 1702 in the template 1700 is corresponded to the direction to which the vanishing point 1712 of the image 1710 goes. The geometric transformation may be such as affine transformation. Then, the trimming section 96 trims the image 1720 transformed by the transformed image generating section 94 into the shape of the image layout frame 1702. Next, the image layout section 30 lays out an image 1730 trimmed by the trimming section 96 in the image layout frame 1702.

The image output apparatus 10 according to the present embodiment can generate an image geometrically transformed and lay out the same at the image layout position when there is no image corresponding to the composite information associated with the image layout position in the template. Therefore, the image having information corresponding to the composite information previously associated with the image layout position in the template can be automatically laid out without capturing and generating any image again by the user even if the image storage section 50 does not store any image corresponding to the composite information of the image to be disposed at the image layout position.

Figure 18:
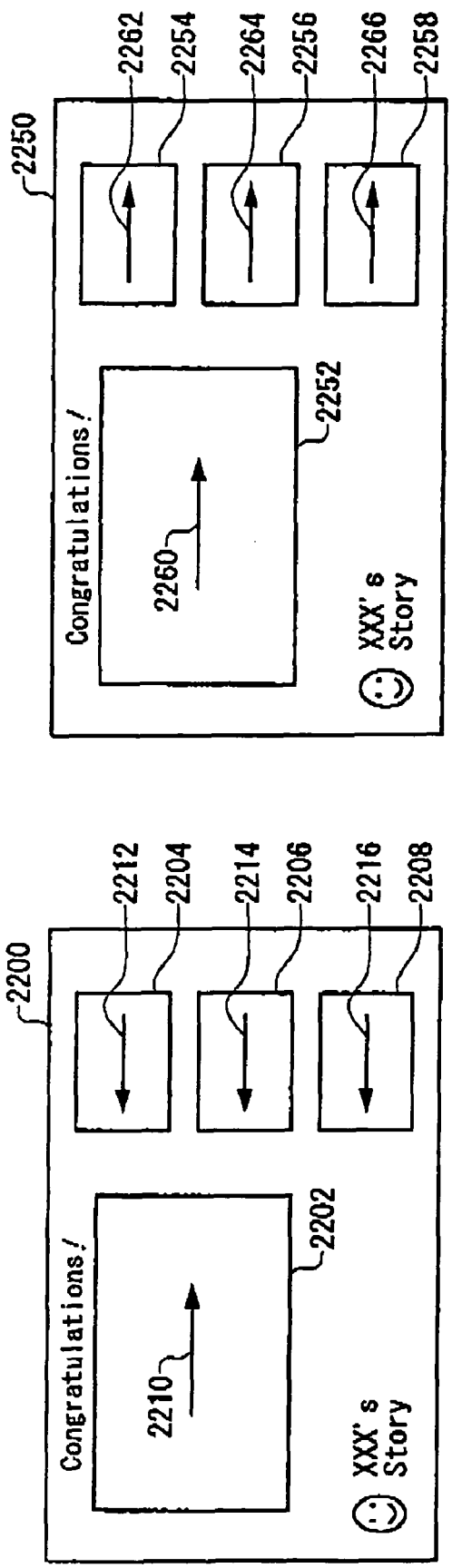
FIG. 18 shows the processing of an object orientation determining section 86.

FIG. 18 shows the processing of the object orientation determining section 86 according to the present embodiment. Firstly, the template storage section 70 stores a template for the output region in which at least one of image layout position at which an image is disposed is previously determined. Specifically, the template storage section 70 may store the template for the output region in which a first image layout position at which a first image should be disposed and a second image layout position at which a second image should be disposed are previously determined. Then, the first image selecting section 82 selects the first image to be disposed at the first image layout position. Next, the object orientation determining section 86 determines the orientation of the object included in the second image to be disposed at the second image layout position depending on the orientation of the object included in the first image selected by the first image selecting section 82. Additionally, the object orientation determining section 86 may determine the orientation of the object included in the second image to be disposed at the second image layout position based on the object orientation in the first image selected by the first image selecting section 82 and the relative orientation of the object stored in the template storage section 70.

For example, in a template 2200, an image selected by the first image selecting section 82 is laid out at an image layout position 2202. Here, the object included in the image faces to a direction 2210. In this case, the object orientation determining section 86 may associate a direction 2212 with an image layout position 2204 in order that the image facing to the direction opposite to the direction 2210 is disposed at the image layout position 2204. Additionally, in a template 2250, the image selected by the first image selecting section 82 is laid out at an image layout position 2252. Here, the object included in the image faces to a direction 2260. In this case, the object orientation determining section 86 may associate a direction 2262 with an image layout position 2254 in order that the image facing to the direction equal to the direction 2260 is disposed at the image layout position 2254. Here, the object orientation determining section 86 may associate different direction with each image layout position when a plurality of image layout positions are included in the template. Then, the second image selecting section 84 selects the second image including the object with the orientation determined by the object orientation determining section 86 from the image storage section 50. Then, the image layout section 30 lays out the images selected by the second image selecting section 84 at the image layout positions, respectively.

The image output apparatus 10 according to the present embodiment can determine the orientation of the object included in the image to be disposed into the second image layout frame depending on the orientation of the object included in the image disposed into the first image layout frame. Therefore, the appropriately laid out image can be automatically outputted without selecting the second image by the user.

Figure 19:
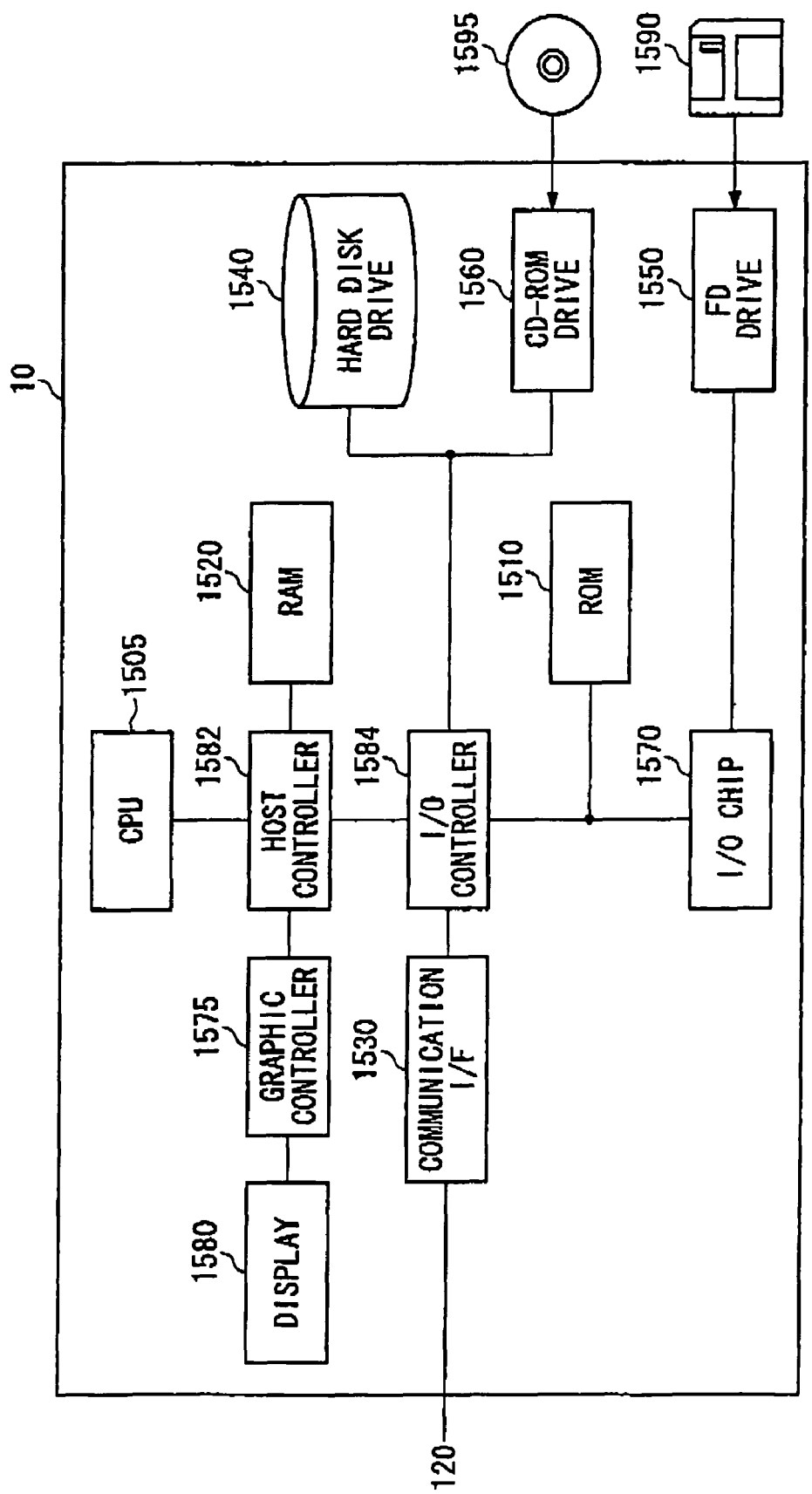
FIG. 19 is a block diagram showing the hardware configuration of the image output apparatus 10.

FIG. 19 is a block diagram of the hardware configuration of the image output apparatus 10 according to the present embodiment. The image output apparatus 10 according to the present embodiment includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the communication interface 1530, the hard disk drive 1540 and the CD-ROM drive 1560 which are relatively high-speed input/output units to the host controller 1582. The communication interface 1530 communicates with the other units through a network. The hard disk drive 1540 stores the program and data used by the CPU 1505 in the image output apparatus 10. The CD-ROM drive 1560 reads the program or data from the CD-ROM 1595 and provides the same to the hard disk drive 1540 through the RAM 1520.

The ROM 1510, the flexible disk drive 1550 and an input/output chip which are relatively low-speed input/output apparatus are connected to the input/output controller 1584. The ROM 1510 stores a boot program executed by the image output apparatus 10 at activating and a program depending on the hardware of the image output apparatus 10. The flexible disk drive 1550 reads the program or data from the flexible disk 1590 and provides the same to the hard disk drive 1540 through the RAM 1520. The input/output chip 1570 connects various input/output units through the flexible disk drive 1550, such as a parallel port, a serial port, a keyboard port and a mouse port.

A program provided to the hard disk drive 1540 through the RAM 1520 is stored on a recording medium such as the flexible disk 1590, the CD-ROM 1595 or IC card and provided by the user. The image output program is read from the recording medium, installed in the hard disk drive 1540 in the image output apparatus 10 through the RAM and executed by the CPU 1505. The image output program installed in and executed by the image output apparatus 10 operates the CPU 1505 to the image output apparatus 10 to function as: the object orientation identification section 20; the image layout section 30; the image output section 40; the image storage section 50; the partial image storage section 60; the face region extraction section 210; the partial region extraction section 220; the face orientation identification section 230; the template storage section 70; the image selecting section 80; the object orientation determining section 86; the trimming image generating section 90; the image rotational processing section 92; the transformed image generating section 94; the trimming section 96; the first image selecting section 82; and the second image selecting section which are described above with reference to FIG. 1-18.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An image output apparatus comprising:
an object orientation identification section for identifying the orientation of an object in an image;
an image layout section for laying out the image within an output region based on the object orientation identified by the object orientation identification section, wherein the image layout section lays out the image such that the object orientation identified by the object orientation identification section faces to the center of the output region;
a template storage section for storing a template for the output region in which an image layout position and the object orientation included in the image to be disposed at the image layout position are previously determined;
an image selecting section for selecting the image in which the object orientation associated with the image layout position included in the template stored in the template storage section is corresponded to the object orientation identified by the object orientation identification section,
wherein the image layout section lays out the image at the image layout position in the template selected by the image selecting section; and
an image output section for outputting the image laid out within the output region by the image layout section.

2. The image output apparatus according to claim 1, wherein
the object is a person;
the object orientation identification section identifies the orientation of the person in the image; and
the image layout section lays out the image based on the orientation of the person identified by the object orientation identification section.

3. The image output apparatus according to claim 2, wherein
the object orientation identification section identifies the orientation of the person's body in the image, and
the image layout section lays out the image based on the orientation of the person's body identified by the object orientation identification section.

4. The image output apparatus according to claim 2, wherein
the object orientation identification section identifies the orientation of the person's face included in the image, and the image layout section lays out the image based on the orientation of the person's face identified by the object orientation identification section.

5. The image output apparatus according to claim 4, wherein the object orientation identification section including:
a face region extraction section for extracting the region of the person's face included in the image;
a partial region extraction section for extracting a plurality of parts constituting the person's face which are included in the face region extracted by the face region extraction section; and
a face orientation identification section for identifying the orientation of the person's face in the image based on the positions of the plurality of parts extracted by the partial region extraction section in the face region extracted by the face region extraction section.

6. The image output apparatus according to claim 1, wherein
the object is a person,
the object orientation identification section identifies a line of sight of the person in the image, and
the image layout section lays out the image based on the line of sight of the person identified by the object orientation identification section.

7. The image output apparatus according to claim 1, wherein
the image output section has a display section for displaying the image laid out by the image layout section,
the image layout section lays out the image within the output region on a display screen of the display section based on the object orientation identified by the object orientation identification section.

8. The image output apparatus according to claim 1, wherein
the image output section has a printing section for printing the image laid out by the image layout section, and
the image layout section lays out the image within the output region of a printing media in the printing section.

9. The image output apparatus according to claim 1, wherein the image selecting section selects the image in which the area in the image located in the direction of the object orientation identified by the object orientation identification section is larger than the area in the image located in the direction opposite to the direction identified by the object orientation identification section.

10. The image output apparatus according to claim 1, further comprising a trimming image generating section for trimming an object included in the image selected by the image selecting section such that the area in the image located in the direction of the object orientation identified by the object orientation identification section is larger than the area in the image located in the direction opposite to the object orientation identified by the object orientation identification section, wherein
the image layout section lays out the trimming image generated by the trimming image generating section at the image layout position in the template.

11. The image output apparatus according to claim 1, further comprising a transformed image generating section for generating an image geometrically transformed such that the object orientation identified by the object orientation identification section is corresponded to the object orientation associated with the image layout position in the template stored in the template storage section when there is no image in which the object orientation identified by the object orientation identification section is corresponded to the object orientation associated with the image layout position included in the template stored in the template storage section, wherein
the image layout section lays out the image generated by the transformed image generating section at the image layout position.

12. The image output apparatus according to claim 11 further comprising a trimming section for trimming the image generated by the transformed image generating section into the shape of an image layout frame at the image layout position, wherein
the image layout section lays out the image trimmed by the trimming section at the image layout position.

13. The image output apparatus according to claim 1, wherein
the object orientation identification section identifies information indicative of an angle between the normal line direction of the image and the direction to which the object faces, and
the image selecting section selects the image in which the information indicative of the angle identified by the object orientation identification section is corresponded to the information indicative of the angle associated with the image layout position included in the template stored in the template storage section.

14. The image output apparatus according to claim 13 further comprising an image rotational processing section for rotating the image along the horizontal direction of the image plane in order that the information indicative of the angle identified by the object orientation identification section is corresponded to the information indicative of the angle associated with the image layout position in the template stored in the template storage section when there is no image in which the information indicative of the angle identified by the object orientation identification section is corresponded to the information indicative of the angle associated with the image layout position included in the template stored in the template storage section, wherein
the image layout section lays out the image rotated by the image rotational processing section at the image layout position in the template.

15. The image output apparatus according to claim 14 further comprising a trimming section for trimming the image rotated by the image rotational processing section into the shape of the image layout frame at the image layout position, wherein
the image layout section lays out the image trimmed by the trimming section at the image layout position.

16. The image output apparatus according to claim 13, wherein the image selecting section selects the image in which the area in the image located in the direction of the object orientation identified by the object orientation identification section when the angle indicated by the information identified by the object orientation identification section is larger.

17. The image output apparatus according to claim 13 further comprising a trimming image generating section for trimming the object included in the image selected by the image selecting section such that the area in the image located in the direction of the object orientation identified by the object orientation identification section is larger when the angle indicated by the information identified by the object orientation identification section is larger, wherein
the image layout section lays out the trimming image generated by the trimming image generating section at the image layout position in the template.

18. The image output apparatus according to claim 13 further comprising a transformed image generating section for generating an image geometrically transformed such that the information indicative of the angle identified by the object orientation identification section is corresponded to the information indicative of the angle associated with the image layout position in the template stored in the template storage section when there is no image in which the information indicative of the angle identified by the object orientation identification section is corresponded to the information indicative of the angle associated with the image layout position included in the template stored in the template storage section, wherein the image layout section lays out the image generated by the transformed image generating section at the image layout position.

19. The image output apparatus according to claim 18 further comprising a trimming section for trimming the image generated by the transformed image generating section into the shape of the image layout frame at the image layout position, wherein the image layout section lays out the image trimmed by the trimming section at the image layout position.

20. The image output apparatus according to claim 1 further comprising:

a template storage section for storing a template for the output region in which a first image layout position at which a first image should be disposed and a second image layout position at which a second image should be disposed are previously determined;

a first image selecting section for selecting the first image to be disposed at the first image layout position;

an object orientation determining section for determining the orientation of the object included in the second image to be disposed at the second image layout position depending on the orientation of the object included in the first image selected by the first image selecting section; and a second image selecting section for selecting the second image including the object with the orientation determined by the object orientation determining section, wherein the image layout section lays out the first image selected by the first image selecting section at the first image layout position and lays out the second image selected by the second image selecting section at the second image layout position.

21. The image output apparatus according to claim 20, wherein the template storage section stores a template for the output region in which the second image layout position and the relative object orientation with respect to the object orientation included in the first image, the object orientation determining section determines the orientation of the object included in the second image to be disposed at the second image layout position based on the object orientation included in the first image selected by the first image selecting section and the relative object orientation stored in the template storage section.

22. A computer-implemented image output method comprising:

identifying the orientation of an object in an image;

laying out the image within an output region based on the object orientation identified by the object orientation identifying step, wherein the image is laid out such that the identified object orientation faces to the center of the output region;

storing a template for the output region in which an image layout position and the object orientation included in the image to be disposed at the image layout position are previously determined; and selecting the image in which the object orientation associated with the image layout position included in the stored template is corresponded to the identified object orientation, wherein the image is laid out at the image layout position in the selected template outputting the image laid out within the output region in the image laying out step.

23. A computer-readable medium, storing an image output program, executed by a processor, for outputting an image, the image output program operating the image output apparatus to function as:

an object orientation identification section for identifying the orientation of an object in an image;

an image layout section for laying out the image within an output region based on the object orientation identified by the object orientation identification section, wherein the image layout section lays out the image such that the object orientation identified by the object orientation identification section faces to the center of the output region;

a template storage section for storing a template for the output region in which an image layout position and the object orientation included in the image to be disposed at the image layout position are previously determined;

an image selecting section for selecting the image in which the object orientation associated with the image layout position included in the template stored in the template storage section is corresponded to the object orientation identified by the object orientation identification section, wherein the image layout section lays out the image at the image layout position in the template selected by the image selecting section; and an image output section for outputting the image laid out within the output region by the image layout section.

* * * * *